United States Patent
Oh et al.

(10) Patent No.: US 10,333,737 B2
(45) Date of Patent: Jun. 25, 2019

(54) METHOD OF ALIGNING INTERFERENCE IN WIRELESS LOCAL AREA NETWORK

(71) Applicant: ELECTRONICS & TELECOMMUNICATIONS RESEARCH INSTITUTE, Daejeon (KR)

(72) Inventors: Jin Hyung Oh, Daejeon (KR); Hyun Duk Kang, Gwangju (KR); Gwang Zeen Ko, Daejeon (KR); Igor Kim, Daejeon (KR); Myung Sun Song, Daejeon (KR)

(73) Assignee: ELECTRONICS & TELECOMMUNICATIONS RESEARCH INSTITUTE, Daejeon (KR)

(*) Notice: Subject to any disclaimer, the term of this patent is extended or adjusted under 35 U.S.C. 154(b) by 681 days.

(21) Appl. No.: 14/548,806

(22) Filed: Nov. 20, 2014

(65) Prior Publication Data
US 2015/0139127 A1    May 21, 2015

(30) Foreign Application Priority Data

Nov. 21, 2013  (KR) .................. 10-2013-0141977
Dec. 19, 2013  (KR) .................. 10-2013-0158882
Nov. 19, 2014  (KR) .................. 10-2014-0161410

(51) Int. Cl.
*H04L 25/02*  (2006.01)
*H04W 84/12*  (2009.01)
*H04L 25/03*  (2006.01)

(52) U.S. Cl.
CPC .... *H04L 25/0204* (2013.01); *H04L 25/03898* (2013.01); *H04L 25/03949* (2013.01); *H04W 84/12* (2013.01)

(58) Field of Classification Search
CPC .......... H04L 25/0204; H04L 25/03898; H04L 25/03949; H04W 84/12
See application file for complete search history.

(56) References Cited

U.S. PATENT DOCUMENTS 9,137,726 B2 * 9/2015 Kwon .................. H04L 1/0002
2010/0227613 A1  9/2010 Kim et al.
(Continued)

FOREIGN PATENT DOCUMENTS

KR    1020110137108 A    12/2011

OTHER PUBLICATIONS

Eldad Perahia, Robert Stacey, Next Generation Wireless LANs: 802.11n and 802.11ac, May 23, 2013, Cambridge University Press, pp. 364-438.*

(Continued)

*Primary Examiner* — Xavier Szewai Wong
(74) *Attorney, Agent, or Firm* — Ladas & Parry LLP

(57) ABSTRACT

There is provided a method of aligning interference in a wireless local area network. A method of receiving a frame includes receiving a first frame from a first access point associated with a terminal, comparing a signal level of the first frame with a preset data rate, performing a pre-procedure for interference alignment when the signal level of the first frame is less than the preset data rate, receiving a second frame from the first access point, and aligning interference of the second frame based on information obtained through the pre-procedure. According to the present invention, it is possible to control interference in an overlapping band.

11 Claims, 16 Drawing Sheets

(56) References Cited

U.S. PATENT DOCUMENTS

| | | | |
|---|---|---|---|
| 2010/0227637 A1* | 9/2010 | Kwon | H04J 11/0026 455/522 |
| 2010/0265965 A1* | 10/2010 | Zhang | H04W 56/0005 370/442 |
| 2011/0110288 A1* | 5/2011 | Manssour | H04B 7/15521 370/315 |
| 2012/0028665 A1* | 2/2012 | Kwon | H04L 1/0002 455/501 |
| 2012/0051351 A1* | 3/2012 | Lee | H04W 48/20 370/338 |
| 2012/0093043 A1* | 4/2012 | Choi | H04W 72/00 370/280 |
| 2013/0078991 A1 | 3/2013 | Nam | |
| 2013/0195018 A1* | 8/2013 | Lv | H04W 16/04 370/328 |
| 2014/0051426 A1* | 2/2014 | Siomina | H04W 36/0088 455/422.1 |
| 2014/0056205 A1* | 2/2014 | Aboul-Magd | H04W 72/0426 370/312 |
| 2014/0086212 A1* | 3/2014 | Kafle | H04W 28/044 370/331 |
| 2015/0359008 A1* | 12/2015 | Wang | H04W 74/004 370/330 |

OTHER PUBLICATIONS

Shyamnath Gollakota, et al; "Interference Alignment and Cancellation", SIGCOMM '09 Proceedings of the ACM SIGCOMM 2009 conference on Data Communication, pp. 159-170; Aug. 17-21, Barcelona, Spain.

* cited by examiner

METHOD OF ALIGNING INTERFERENCE IN WIRELESS LOCAL AREA NETWORK

CLAIM FOR PRIORITY

This application claims priority to Korean Patent Application No. 10-2013-0141977 filed on Nov. 21, 2013, No. 10-2013-0158882 filed on Dec. 19, 2013, and No 10-2014-0161410 filed on Nov. 19, 2014 in the Korean Intellectual Property Office (KIPO), the entire contents of which are hereby incorporated by reference.

BACKGROUND

1. Technical Field

Example embodiments of the present invention relate to wireless local area network technology, and more specifically, to interference alignment technology for controlling interference in an overlapping band.

2. Related Art

As information and communication technologies develop, various wireless communication technologies are developing. Among them, a wireless local area network (WLAN) is technology for wirelessly accessing the Internet at home or companies or specific service providing areas using mobile terminals such as personal digital assistants (PDAs), laptop computers, portable multimedia players (PMPs), smart phones, and tablet PCs based on wireless frequency technology.

Institute of Electrical and Electronics Engineers (IEEE) 802.11 has been under development as standards for wireless local area network technology. Wireless local area network technology according to the IEEE 802.11a standard operates based on an orthogonal frequency division multiplexing (OFDM) scheme and may provide a maximum transfer rate of 54 Mbps in a 5 GHz band. Wireless local area network technology according to the IEEE 802.11b standard operates based on a direct sequence spread spectrum (DSSS) scheme and may provide a maximum transfer rate of 11 Mbps in a 2.4 GHz band. Wireless local area network technology according to the IEEE 802.11g standard operates based on the OFDM scheme or the DSSS scheme and may provide a maximum transfer rate of 54 Mbps in the 2.4 GHz band.

Wireless local area network technology according to the IEEE 802.11n standard operates based on the OFDM scheme in the 2.4 GHz band and the 5 GHz band, and when a multiple input multiple output-OFDM (MIMO-OFDM) scheme is used, may provide a maximum transfer rate of 300 Mbps for four spatial streams. Wireless local area network technology according to the IEEE 802.11n standard may support up to a channel bandwidth of 40 MHz and may provide a maximum transfer rate of 600 Mbps in this case.

As such wireless local area networks are being spread more actively and applications using the same become more diverse, a need for new wireless local area network technology for supporting a throughput higher than a data processing rate supported by IEEE 802.11n is increasing. Very high throughput (VHT) wireless local area network technology is one of the IEEE 802.11 wireless local area network technologies proposed to support a data processing rate of 1 Gbps or more. Among them, IEEE 802.11ac is developing as a standard for providing the VHT in a band of 5 GHz or less, and IEEE 802.11ad is developing as a standard for providing the VHT in a 60 GHz band.

As use of the wireless local area network has recently been increased, neighbor access points are highly likely to use an overlapping band. Accordingly, there is a problem in that communication performance decreases in the overlapping band between neighbor access points.

SUMMARY

In order to address the above problems, example embodiments of the present invention are provided to a method of aligning interference for controlling interference in an overlapping band between neighbor access points in a wireless local area network.

In some example embodiments, a method of receiving a frame that is performed in a terminal, the method includes receiving a first frame from a first access point associated with the terminal, comparing a signal level of the first frame with a preset data rate, performing a pre-procedure for interference alignment when the signal level of the first frame is less than the preset data rate, receiving a second frame from the first access point, and aligning interference of the second frame based on information obtained through the pre-procedure.

The performing of the pre-procedure may include obtaining information on at least one neighbor access point operated in a channel overlapping an operation channel of the first access point, and performing a procedure for estimating a channel between the first access point and the at least one neighbor access point.

In the obtaining of information on at least one neighbor access point, information on the at least one neighbor access point operated within a preset channel range based on an operation channel of the first access point may be obtained.

The obtaining of information on at least one neighbor access point may include, transmitting a probe request frame to the at least one neighbor access point operated in the overlapping channel, and receiving a probe response frame that is a response for the probe request frame from the at least one neighbor access point.

The probe request frame may include information indicating that a frame transmission and reception procedure based on interference alignment is started.

The probe response frame may include at least one of operation channel information, bandwidth information and antenna information of the at least one neighbor access point.

The performing of the procedure for estimating a channel may include receiving a null data packet (NDP) request frame from the first access point, and transmitting an NDP response frame that is a response for the NDP request frame to each of the first access point and the at least one neighbor access point.

The performing of the pre-procedure for interference alignment may include, obtaining information on at least one neighbor access point operated in a channel overlapping an operation channel of the first access point, transmitting the information on at least one neighbor access point to the first access point, performing a procedure for estimating a channel between the first access point and the at least one neighbor access point, and announcing completion of the pre-procedure for interference alignment.

The obtaining of information on at least one neighbor access point may include, transmitting a probe request frame to the at least one neighbor access point operated in the overlapping channel, and receiving a probe response frame that is a response for the probe request frame from the at least one neighbor access point.

The probe request frame may include information indicating that a frame transmission and reception procedure based on interference alignment is started.

The probe response frame may include at least one of operation channel information, bandwidth information and antenna information of the at least one neighbor access point.

The performing of the procedure for estimating a channel may include, receiving an NDP request frame from the first access point, transmitting an NDP announcement frame for announcing transmission of an NDP response frame to each of the first access point and the at least one neighbor access point, and transmitting the NDP response frame to the first access point and the at least one neighbor access point.

The NDP announcement frame may include identification information of each of the first access point and the at least one neighbor access point.

The announcing of completion of the pre-procedure for interference alignment may include, transmitting an interference alignment (IA) request to send (RTS) frame indicating completion of the pre-procedure for interference alignment to each of the first access point and the at least one neighbor access point, and receiving an IA clear to send (CTS) frame that is a response for the IA RTS frame from each of the first access point and the at least one neighbor access point.

In other example embodiments, a terminal includes a processor, and a memory in which at least one program command executed through the processor is stored, wherein the at least one program command causes the terminal to execute, receiving a first frame from a first access point associated with the terminal, comparing a signal level of the first frame with a preset minimum data rate, performing a pre-procedure for interference alignment when the signal level of the first frame is less than the preset minimum data rate, receiving a second frame from the first access point, and aligning interference of the second frame based on information obtained through the pre-procedure.

The performing of the pre-procedure for interference alignment may include, obtaining information on at least one neighbor access point operated in a channel overlapping an operation channel of the first access point, and performing a procedure for estimating a channel between the first access point and the at least one neighbor access point.

The obtaining of information on at least one neighbor access point may include, transmitting a probe request frame to the at least one neighbor access point operated in the overlapping channel, and receiving a probe response frame that is a response for the probe request frame from the at least one neighbor access point.

The performing of the procedure for estimating a channel may include, receiving a null data packet (NDP) request frame from the first access point, and transmitting an NDP response frame that is a response for the NDP request frame to each of the first access point and the at least one neighbor access point.

The performing of the pre-procedure for interference alignment may include, obtaining information on at least one neighbor access point operated in a channel overlapping an operation channel of the first access point, transmitting the information on at least one neighbor access point to the first access point, performing a procedure for estimating a channel between the first access point and the at least one neighbor access point, and announcing completion of the pre-procedure for interference alignment.

The announcing of completion of the pre-procedure for interference alignment may include, transmitting an interference alignment (IA) request to send (RTS) frame indicating completion of the pre-procedure for interference alignment to each of the first access point and the at least one neighbor access point, and receiving an IA clear to send (CTS) frame that is a response for the IA RTS frame from each of the first access point and the at least one neighbor access point.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
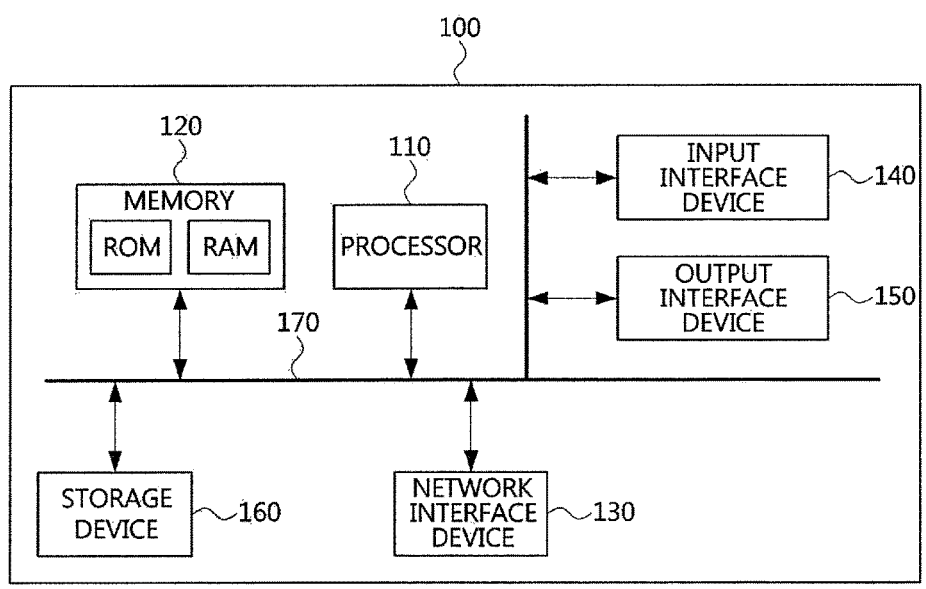
FIG. 1 is a block diagram illustrating an embodiment of a station for performing methods according to the present invention.

While the invention can be modified in various ways and take on various alternative forms, specific embodiments thereof are shown in the drawings and will be described in detail.

It should be understood, however, that there is no intent to limit the invention to the particular forms disclosed, but on the contrary, the invention is to cover all modifications, equivalents, and alternatives falling within the spirit and scope of the invention.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in detail with reference to the accompanying drawings. In order to facilitate overall understanding of the invention, like reference numerals in the drawings denote like elements, and thus the description thereof will not be repeated.

Throughout this specification, the term "station (STA)" refers to any functional medium including medium access control (MAC) and a physical layer interface of a wireless medium according to specifications of the Institute of Electrical and Electronics Engineers (IEEE) 802.11 standards. The STA may be classified as an STA serving as an access point (AP) or an STA serving as a non-access point (non-AP). The STA serving as the AP may be simply called an AP, and the STA serving as the non-AP may be simply called a terminal.

The STA may include a processor and a transceiver, and may further include a user interface, a display device, and the like. The processor may refer to a unit configured to generate a frame to be transmitted via a wireless network or process a frame received via the wireless network and may perform several functions for controlling the STA. The transceiver refers to a unit functionally connected to the processor and configured to transmit and receive a frame via the wireless network for the STA.

The AP may refer to a centralized controller, a base station (BS), a radio access station, a node B, an evolved node B, a relay, a mobile multihop relay (MMR)-BS, a base transceiver system (BTS), a site controller or the like, and may include some or all functions thereof.

The term "terminal (that is, a non-AP) may refer to a wireless transmit/receive unit (WTRU), user equipment (UE), a user terminal (UT), an access terminal (AT), a mobile station (MS), a mobile terminal, a subscriber unit, a subscriber station (SS), a wireless device, a mobile subscriber unit or the like, and may include some or all functions thereof.

Here, the term "terminal" may refer to a desktop computer, a laptop computer, a tablet PC, a wireless phone, a mobile phone, a smart phone, a smart watch, smart glass, an e-book reader, a portable multimedia player (PMP), a portable game console, a navigation device, a digital camera, a digital multimedia broadcasting (DMB) player, a digital audio recorder, a digital audio player, a digital picture recorder, a digital picture player, a digital video recorder, a digital video player or the like which are capable of communication.

FIG. 1 is a block diagram illustrating an embodiment of a station for performing methods according to the present invention.

As illustrated in FIG. 1, a station 100 may include at least one processor 110, a memory 120, and a network interface device 130 configured to perform communication via a network. Also, the station 100 may further include an input interface device 140, an output interface device 150, a storage device 160, and the like. Components included in the station 100 may be connected through a bus 170 to communicate with each other.

The processor 110 may execute a program command stored in the memory 120 and/or the storage device 160. The processor 110 may refer to a central processing unit (CPU), a graphics processing unit (GPU) or a dedicated processor in which methods according to the present invention are performed. The memory 120 and the storage device 160 may include a volatile storage medium and/or non-volatile storage medium. For example, the memory 120 may include a read only memory (ROM) and/or a random access memory (RAM).

Embodiments of the present invention are applied to a wireless local area network system according to IEEE 802.11, and may be applied to other communication systems in addition to the wireless local area network system according to IEEE 802.11.

For example, embodiments of the present invention may be applied to a mobile Internet such as a wireless personal area network (WPAN), a wireless body area network (WBAN), a Wireless Broadband Internet (WiBro) or world interoperability for microwave access (WiMax), a 2G mobile communication network such as global system for mobile Communication (GSM) or code division multiple access (CDMA), a 3G mobile communication network such as wideband code division multiple access (WCDMA) or CDMA 2000, a 3.5G mobile communication network such as high speed downlink packet access (HSDPA) or high speed uplink packet access (HSUPA), a 4G mobile communication network such as Long Term Evolution (LTE) or LTE-Advanced, a 5G mobile communication network, and the like.

Figure 2:
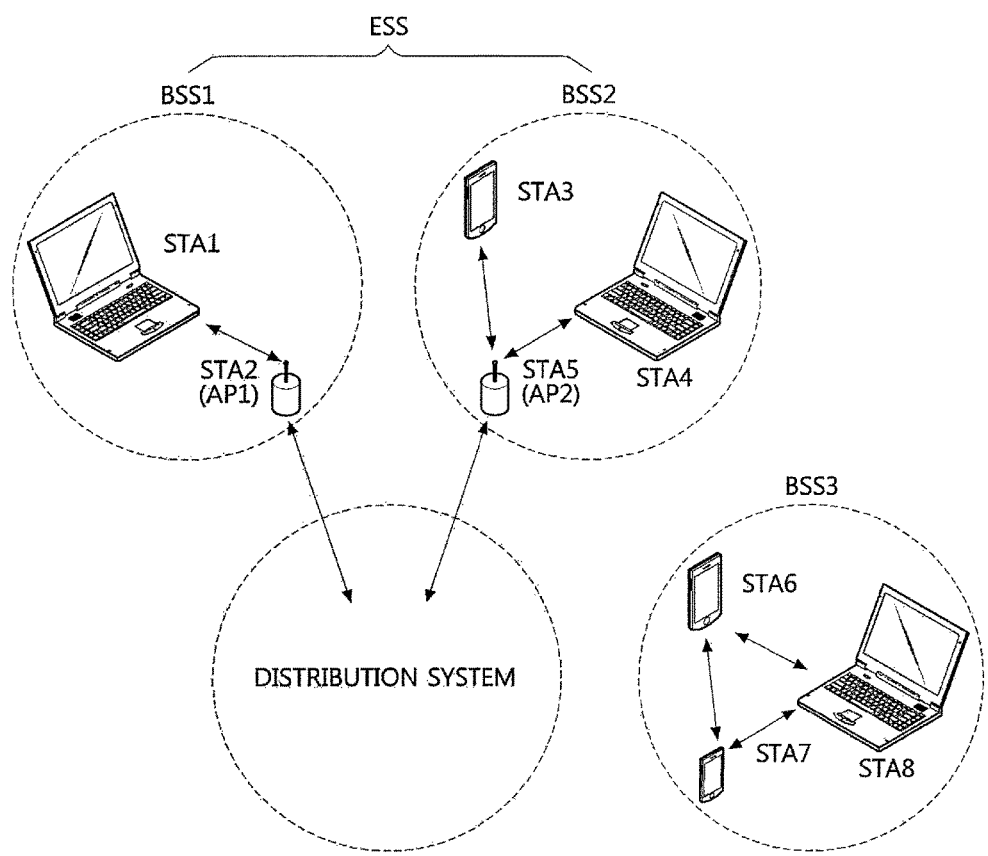
FIG. 2 is a conceptual diagram illustrating an embodiment of a configuration of a wireless local area network system according to IEEE 802.11.

FIG. 2 is a conceptual diagram illustrating an embodiment of a configuration of a wireless local area network system according to IEEE 802.11.

As illustrated in FIG. 2, the wireless local area network system according to IEEE 802.11 may include at least one basic service set (BSS). The BSS refers to a set of stations STA1, STA2 (AP1), STA3, STA4, STA5 (AP2), STA6, STA7, and STA8 which can be successfully synchronized to communicate with each other and does not refer to a concept of a specific area.

The BSS may be classified as an infrastructure BSS or an independent BSS (IBSS). Here, BSS1 and BSS2 refer to the infrastructure BSS, and BSS3 refers to the IBSS.

BSS1 may include a first terminal STA1, a first access point STA2 (AP1) configured to provide a distribution service, and a distribution system (DS) configured to connect a plurality of access points STA2 (AP1) and STA5 (AP2). In BSS1, the first access point STA2 (AP1) may manage the first terminal STA1.

BSS2 may include a third terminal STA3, a fourth terminal STA4, a second access point STA5 (AP2) configured to provide a distribution service, and a distribution system (DS) configured to connect a plurality of access points STA2 (AP1) and STA5 (AP2). In BSS2, the second access point STA5 (AP2) may manage the third terminal STA3 and the fourth terminal STA4.

BSS3 refers to the IBSS operated in an ad-hoc mode. BSS3 has no access point serving as an entity (a centralized management entity) that performs a management function in the center. That is, in BSS3, terminals STA6, STA7 and STA8 may be managed in a distributed manner. In BSS3, all terminals STA6, STA7 and STA8 may refer to a mobile terminal and build a self-contained network since accessing the distribution system is prohibited.

The access points STA2 (AP1) and STA5 (AP2) may provide access to the distribution system (DS) for terminals STA1, STA3 and STA4 connected thereto through a wireless medium. Communication among terminals STA1, STA3 and STA4 in BSS1 and BSS2 is generally performed through the access points STA2 (AP1) and STA5 (AP2), or when a direct link is set, direct communication among the terminals STA1, STA3 and STA4 is possible.

A plurality of infrastructures BSSs may be connected through the distribution system. The plurality of BSSs connected through the distribution system are called an extended service set (ESS). Entities STA1, STA2 (AP1), STA3, STA4 and STA5 (AP2) included in the ESS may communicate with each other. Any terminal STA1, STA3 or STA4 in the same ESS may seamlessly communicate and move from one BSS to another BSS.

The distribution system is a mechanism for one access point to communicate with another access point. According to the distribution system, the access point may transmit a frame for terminals connected to the BSS that it manages or transmit a frame for any terminal that has moved to another BSS. Also, the access point may transmit and receive a frame via an external network such as a wired network. This distribution system does not necessarily have a network structure, but may have any structure as long as a predetermined distribution service specified in the IEEE 802.11 standards can be provided. For example, the distribution system may be a wireless network such as a mesh network or a physical structure connecting access points.

Meanwhile, as the number of stations in the wireless local area network increases, contention for accessing a non-overlapping channel increases. Channel settings in a 2.4 GHz industrial scientific medical (ISM) band are as follows.

Figure 3:
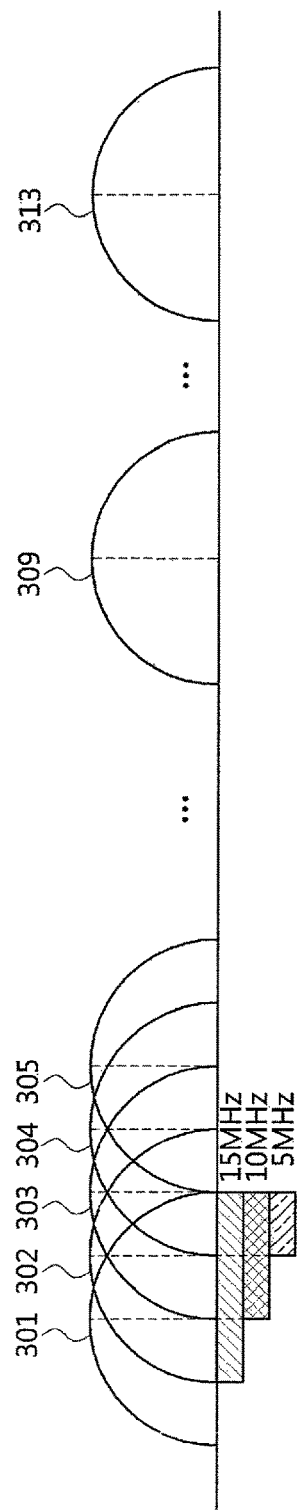
FIG. 3 is a conceptual diagram illustrating channel settings in a 2.4 GHz ISM band.

FIG. 3 is a conceptual diagram illustrating channel settings in a 2.4 GHz ISM band.

As illustrated in FIG. 3, in the 2.4 GHz ISM band, a channel 1 301, a channel 5 305, a channel 9 309 and a channel 13 313 may be set not to overlap. Since successive channels such as the channel 1 301, a channel 2 302, and a channel 3 303 may interfere with one another, use of the channel 1 301, the channel 5 305, the channel 9 309 and the channel 13 313, which are non-overlapping channels, is required as a policy. However, as the number of stations significantly increases, non-overlapping channels 301, 305, 309 and 313 are used to be shared on a time axis by a plurality of stations in the 2.4 GHz ISM band. Accordingly, there are problems in that frequency efficiency of the non-overlapping channels 301, 305, 309 and 313 decreases and performance of the wireless local area network ultimately decreases.

In order to address such problems, a channel overlapping a neighbor channel may be used. However, in this case, interference between neighbor channels occurs and transmission performance decreases. For example, when the channel 1 301 and the channel 2 302 are simultaneously used, a frequency may overlap by 15 MHz. When the channel 1 301 and the channel 3 303 are simultaneously used, a frequency may overlap by 10 MHz. When the channel 1 301 and a channel 4 304 are simultaneously used, a frequency may overlap by 5 MHz. For example, when a first transmitter operates in the channel 1 301 and a second transmitter operates in the channel 2 302, a receiver positioned in an overlapping area between the channel 1 301 and the channel 2 302 may not reliably receive a frame due to interference between the neighbor channels 301 and 302.

However, when interference alignment (IA) technology is used, interference of a frame transmitted through an overlapping band may be minimized. In order to apply interference alignment technology, signaling and a protocol related to information exchange between stations participating in interference alignment are necessary. Hereinafter, the signaling and protocol related to information exchange between stations participating in interference alignment will be described. That is, in a centralized topology (that is, an environment having a controller) or a decentralized topology (that is, an environment having no controller), a method of exchanging information between stations constituting an overlapped basic service set (OBSS) and a criterion and method for a specific station to participate in interference alignment will be described.

Figure 4:
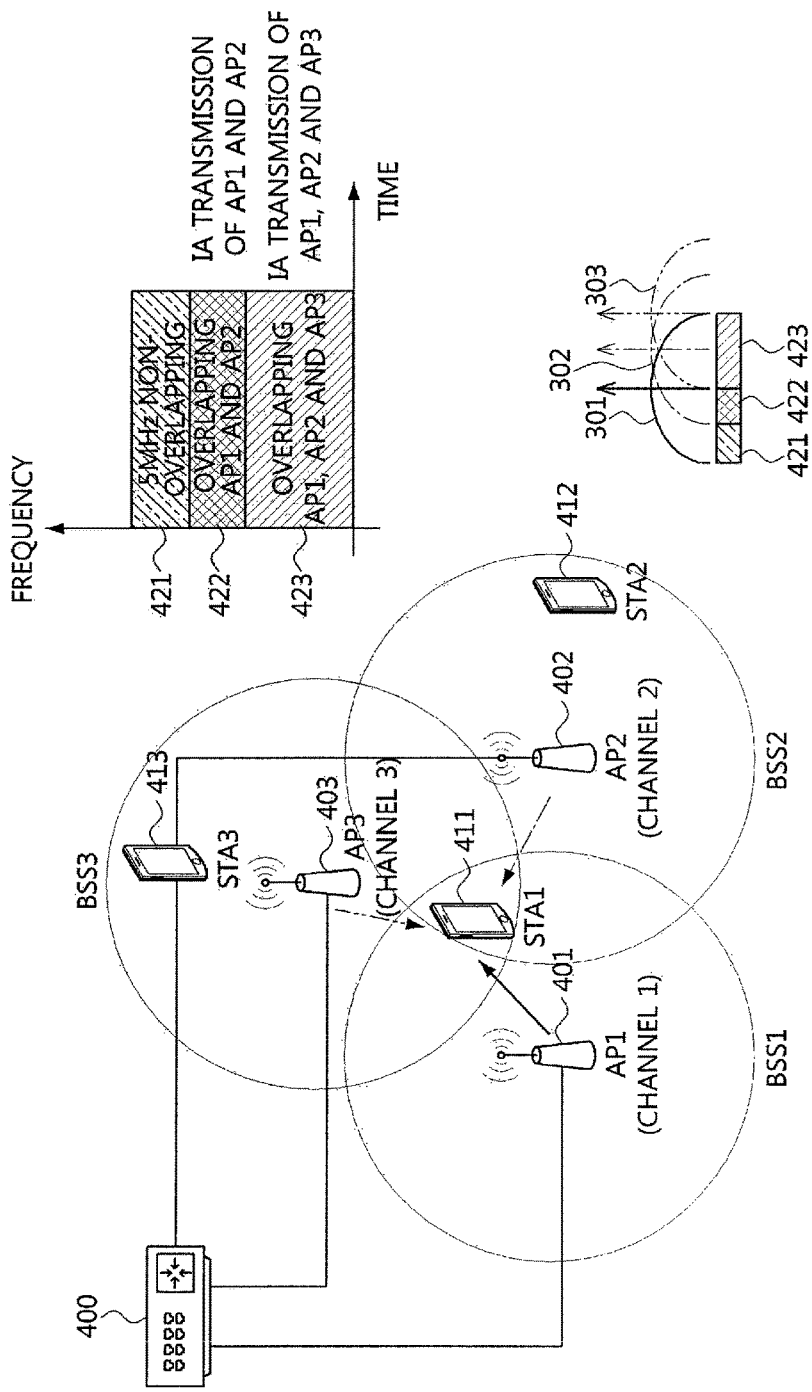
FIG. 4 is a conceptual diagram illustrating a centralized topology to which interference alignment technology is applied.

A Frame Transmission and Reception Method Based on Interference Alignment in a Centralized Topology FIG. 4 is a conceptual diagram illustrating a centralized topology to which interference alignment technology is applied.

As illustrated in FIG. 4, a controller 400 may be connected to access points 401, 402 and 403 via wireless or wired communication and may control the access points 401, 402 and 403. The first access point 401 may configure BSS1 that is a range covered by its own signal and operate in the channel 1 301. The second access point 402 may configure BSS2 that is a range covered by its own signal and operate in the channel 2 302. The third access point 403 may configure BSS3 that is a range covered by its own signal and operate in the channel 3 303. Here, the BSS1, the BSS2 and the BSS3 may overlap.

A first terminal 411 may be positioned in an area in which the BSS1, the BSS2 and the BSS3 overlap. When the first terminal 411 communicates with the first access point 401 through the channel 1 301, 15 MHz thereof may be interfered with by the second access point 402 and 10 MHz thereof may be interfered with by third access point 403.

Meanwhile, since a second terminal 412 is not positioned in an area in which the BSS1, the BSS2 and the BSS3 overlap, when the second terminal 412 communicates with the second access point 402 through the channel 2 302, it may not be interfered with by the other access points 401 and 403. Since a third terminal 413 is not positioned in an area in which the BSS1, the BSS2 and the BSS3 overlap, when the third terminal 413 communicates with the third access point 403 through the channel 3 303, it may not be interfered with by the other access points 401 and 402.

Since unique access points may be simply provided in public places and downtowns in which main facilities are densely provided, the above OBSS may be frequently generated. When interference alignment technology is not applied, since the first terminal 411 may receive a signal from the first access point 401 while being interfered with by the neighbor access points 402 and 403, a decoding error may be generated. Also, when the first access point 401 transmits a signal to the first terminal 411 at a low rate in order to minimize interference from the neighbor access points 402 and 403, throughput may decrease.

Figure 5:
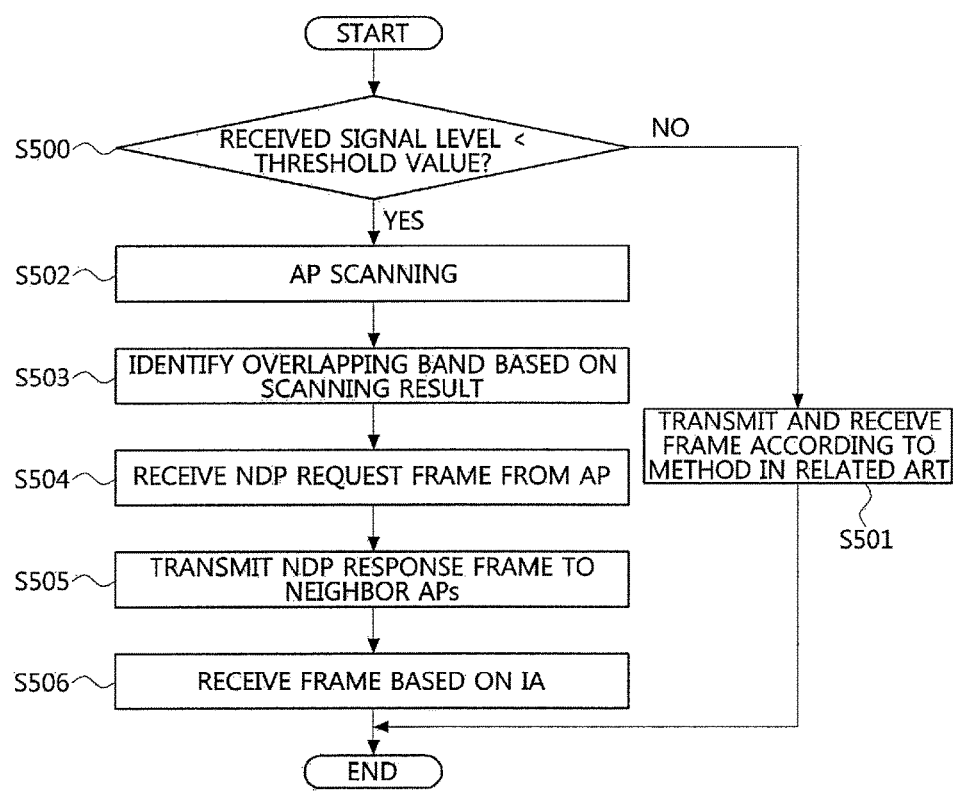
FIG. 5 is a flowchart illustrating a frame transmission and reception method based on interference alignment according to an embodiment of the present invention.
Figure 6A:
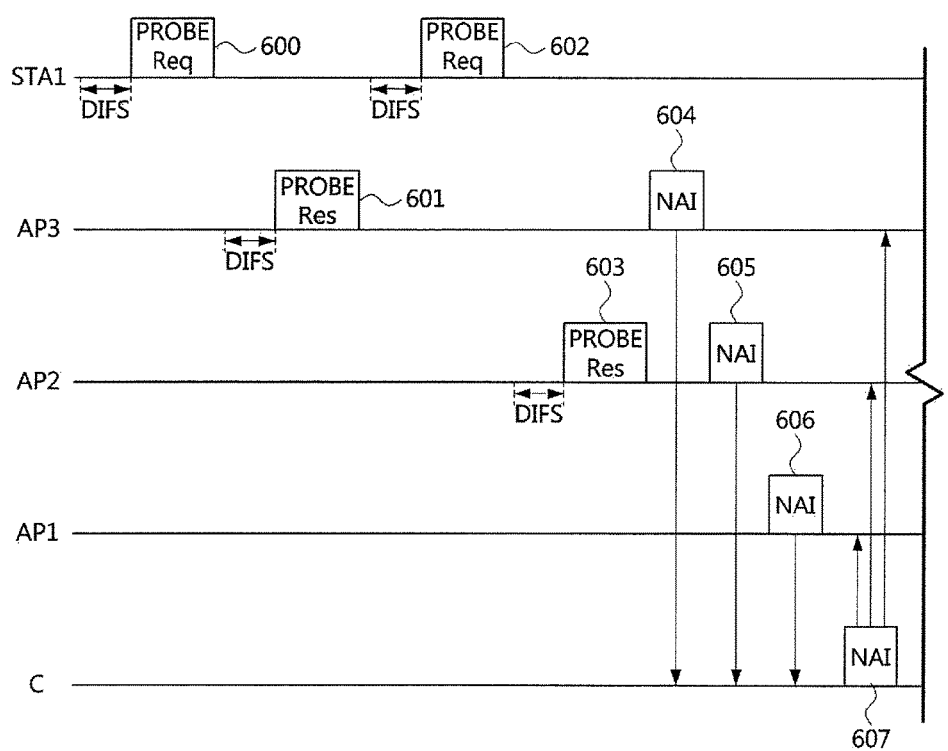
FIGS. 6A and 6B are conceptual diagrams illustrating a frame transmission and reception method based on interference alignment according to an embodiment of the present invention.
Figure 6B:
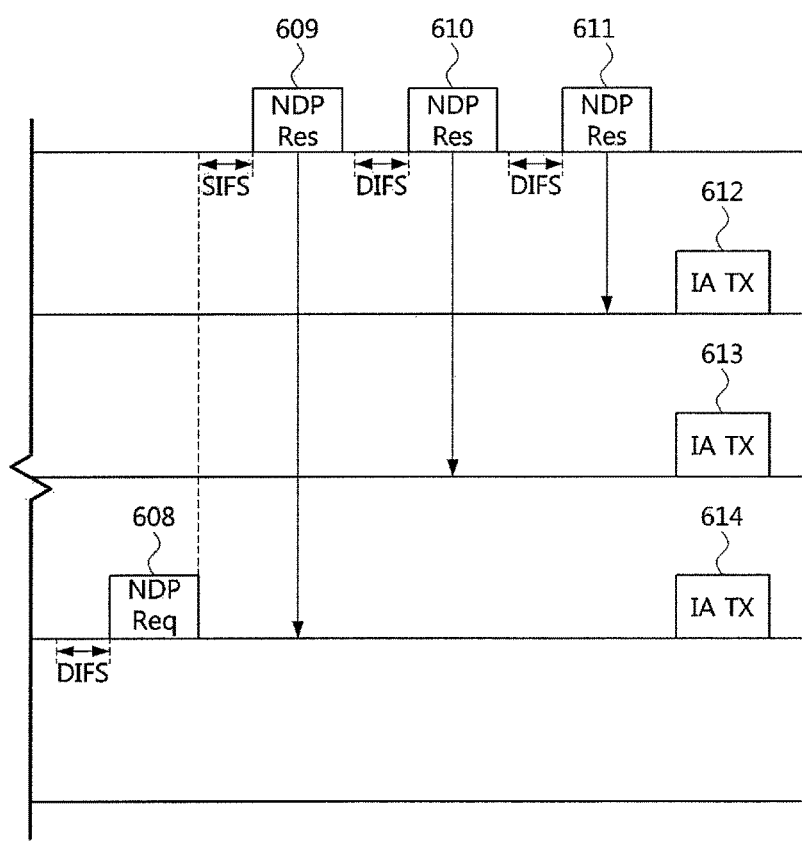

FIG. 5 is a flowchart illustrating a frame transmission and reception method based on interference alignment according to an embodiment of the present invention. FIGS. 6A and 6B are conceptual diagrams illustrating a frame transmission and reception method based on interference alignment according to an embodiment of the present invention.

As illustrated in FIGS. 5, 6A and 6B, the first terminal STA1 may refer to the first terminal 411 positioned in the area in which the BSS1, the BSS2 and the BSS3 overlap in FIG. 4. The first access point AP1 may refer to the first access point 401 (that is, an access point operated in the channel 1 301) configuring the BSS1 in FIG. 4. The second access point AP2 may refer to the second access point 402 (that is, an access point operated in the channel 2 302) configuring the BSS2 in FIG. 4. A third access point AP3 may refer to the third access point 403 (that is, an access point operated in the channel 3 303) configuring the BSS3 in FIG. 4. A controller (C) may refer to the controller 400 configured to control the access points 401, 402 and 403 in FIG. 4. Here, the first terminal STA1 may refer to a terminal associated with the first access point AP1. The first terminal STA1 and the access points AP1, AP2 and AP3 may operate in a 2.4 GHz band.

A frame transmission and reception procedure based on interference alignment may be started by the first terminal STA1 positioned in the area in which the BSSs overlap. The first terminal STA1 connected to the first access point AP1 may transmit or receive a frame to or from the first access point AP1 and compare a signal level of any frame received from the first access point AP1 with a preset threshold value (S500).

That is, the first terminal STA1 may compare a signal level of any frame with a preset threshold value based on the following Formula 1.

$$\log_2(1+SINR) < R_{threshold} \qquad [\text{Formula 1}]$$

In Formula 1, the left-hand side may refer to a ratio of an interference signal and noise level from the neighbor access points AP2 and AP3 with respect to a signal level received from the first access point AP1, from a viewpoint of the first terminal STA1. In Formula 1, the right-hand side may refer to a minimum data rate required by the first terminal STA1.

When the left-hand side is less than the right-hand side in Formula 1 (that is, when an outage occurs), it may refer to the fact that the minimum data rate required by the first terminal STA1 is not satisfied. That is, it may refer to the fact that frame transmission and reception between the first terminal STA1 and the first access point AP1 are unreliable. When this situation continues, the first terminal STA1 has difficulty in successfully decoding the frame received from the first access point AP1 due to interference from the neighbor access points AP2 and AP3. Therefore, when the left-hand side is less than the right-hand side in Formula 1, the first terminal STA1 may start the frame transmission and reception procedure based on interference alignment. On the other hand, when the left-hand side is greater than the right-hand side in Formula 1, the first terminal STA1 may transmit or receive a frame to or from the first access point AP1 according to a method in the related art (S501).

When the frame transmission and reception procedure based on interference alignment is started, the first terminal STA1 may perform a scanning (for example, active scanning or passive scanning) procedure in order to obtain information on neighbor access points (S502). Active scanning in the related art refers to searching all channels (for example, 13 channels in Korea) in the 2.4 GHz band. Here, the first terminal STA1 may scan channels of N−3 to N+3 instead of all channels. Here, N may refer to a channel number in which the first terminal STA1 currently operates. For example, when the outage occurs while the first terminal STA1 transmits or receives a frame to or from the first access point AP1 through the channel 5 305, the first terminal STA1 may scan from the channel 2 302 to a channel 8 (not illustrated).

Meanwhile, since orthogonality between channels is maintained in a 5 GHz band, the first terminal STA1 may identify a bandwidth (for example, 20 MHz, 40 MHz, 80 MHz or 160 MHz) used by access points and then determine a channel range to be scanned. That is, when bands used by access points overlap, the first terminal STA1 may move to a channel in which a corresponding access point operates and scan.

Here, since the first terminal STA1 operates in the channel 1 301, it is assumed that scanning on the channel 2 302 and the channel 3 303 is performed. The first terminal STA1 may transmit a probe request frame 600 through the channel 3 303. In this case, when a channel is in an idle state during a distributed coordination function (DCF) inter frame space (DIFS), the first terminal STA1 may transmit the probe request frame 600 in a broadcast manner after a contention window according to random backoff.

The probe request frame 600 may refer to a probe request frame specified in IEEE 802.11 or a short version (for example, a short probe request frame) of the probe request frame. Also, the probe request frame 600 may refer to a frame specified for the frame transmission and reception procedure based on interference alignment. For example, the probe request frame 600 may further include at least one of information indicating that the frame transmission and reception procedure based on interference alignment is started, identification information (for example, an association identifier (AID), a partial AID (PAID) and a medium access control (MAC) address) of the first terminal STA1, operation channel information (for example, an operation channel number), bandwidth information and antenna information (for example, the number of antennas).

The third access point AP3 operated in the channel 3 303 may receive the probe request frame 600 transmitted from the first terminal STA1. The third access point AP3 may recognize that the frame transmission and reception procedure based on interference alignment is started by the first terminal STA1 based on information included in the probe request frame 600, and recognize identification information, operation channel information, bandwidth information, antenna information, and the like of the first terminal STA1.

The third access point AP3 may transmit a probe response frame 601 that is a response for the probe request frame 600. In this case, when the channel is in an idle state during the DIFS, the third access point AP3 may transmit the probe response frame 601 after a contention window according to random backoff. Here, by transmitting the probe response frame 601, the third access point AP3 may represent participation in the frame transmission and reception procedure based on interference alignment. On the other hand, when the third access point AP3 does not participate in the frame transmission and reception procedure based on interference alignment, a response for the probe request frame 600 may not be transmitted.

The probe response frame 601 may refer to a probe response frame specified in IEEE 802.11 or a short version (for example, a short probe response frame) of the probe response frame. Also, the probe response frame 601 may refer to a frame specified for the frame transmission and reception procedure based on interference alignment. For example, the probe response frame 601 may further include at least one of information indicating participation in the frame transmission and reception procedure based on interference alignment, identification information (for example, a service set identifier (SSID) and a basic service set identifier (BSSID)) of the third access point STA3, operation channel information, bandwidth information, and antenna information.

When the probe response frame 601 is received, the first terminal STA1 may recognize that the third access point AP3 serves as an interference source to the first terminal STA1 and participation in the frame transmission and reception procedure based on interference alignment based on information included in the probe response frame 601. Also, the first terminal STA1 may recognize identification information, operation channel information, bandwidth information, antenna information, and the like of the third access point AP3.

When all responses for the probe request frame 600 are received in the channel 3 303 (or when a waiting time set for receiving a response for the probe request frame 600 is terminated), the first terminal STA1 may move to the channel 2 302 and transmit a probe request frame 602. In this case, when the channel 2 302 is in an idle state during the DIFS, the first terminal STA1 may transmit the probe request frame 602 in a broadcast manner after a contention window according to random backoff. The probe request frame 602 may include the same information as the probe request frame 600 transmitted through the channel 3 303. For example, the probe request frame 602 may include at least one of information indicating that the frame transmission and reception procedure based on interference alignment is started by the first terminal STA1 and identification information, operation channel information, bandwidth information and antenna information of the first terminal STA1.

The second access point AP2 operated in the channel 2 302 may receive the probe request frame 602 transmitted from the first terminal STA1. The second access point AP2 may recognize that the frame transmission and reception procedure based on interference alignment is started by the first terminal STA1 based on information included in the probe request frame 602, and recognize identification information, operation channel information, bandwidth information, antenna information, and the like of the first terminal STA1.

The second access point AP2 may transmit a probe response frame 603 that is a response for the probe request frame 602. In this case, when the channel is in an idle state during the DIFS, the second access point AP2 may transmit the probe response frame 603 after a contention window according to random backoff. Here, by transmitting the probe response frame 603, the second access point AP2 may represent participation in the frame transmission and reception procedure based on interference alignment. On the other hand, when the second access point AP2 does not participate in the frame transmission and reception procedure based on interference alignment, a response for the probe request frame 602 may not be transmitted.

The probe response frame 603 may include the same information as the probe response frame 601. For example, the probe response frame 603 may further include at least one of information indicating participation in the frame transmission and reception procedure based on interference alignment, and identification information, operation channel information, bandwidth information and antenna information of the second access point STA2.

The first terminal STA1 may receive the probe response frame 603 transmitted from the second access point AP2. The first terminal STA1 may recognize that the second access point AP2 serves as an interference source to the first terminal STA1 based on information included in the probe response frame 603 and participation in the frame transmission and reception procedure based on interference alignment. Also, the first terminal STA1 may recognize identification information, operation channel information, bandwidth information, antenna information, and the like of the second access point AP2.

Also, when all responses for the probe request frame 602 are received in the channel 2 302 (or when a waiting time set for receiving a response for the probe request frame 602 is terminated), the first terminal STA1 may move to the channel 4 304 and transmit a probe request frame (not illustrated) and receive a probe response frame (not illustrated) that is a response for the probe request frame (not illustrated).

When the scanning procedure is completed, the first terminal STA1 may identify an overlapping band based on the scanning result (S503). That is, the first terminal STA1 may identify that some band between the channel 1 301 in which the first terminal STA1 operates and the channel 2 302 in which the second access point AP2 operates overlaps and identify that some band between the channel 1 301 in which the first terminal STA1 operates and the channel 3 303 in which the third access point AP3 operates overlaps. The first terminal STA1 may recognize that interference alignment technology is applied to a subcarrier to be transmitted through the overlapping band.

Then, each of the access points AP1, AP2 and AP3 may transmit neighbor access point information (NAI) frames 604, 605 and 606 to the controller (C) via wired or wireless communication. Hereinafter, configurations of the NAI frames 604, 605 and 606 will be described.

Figure 7:
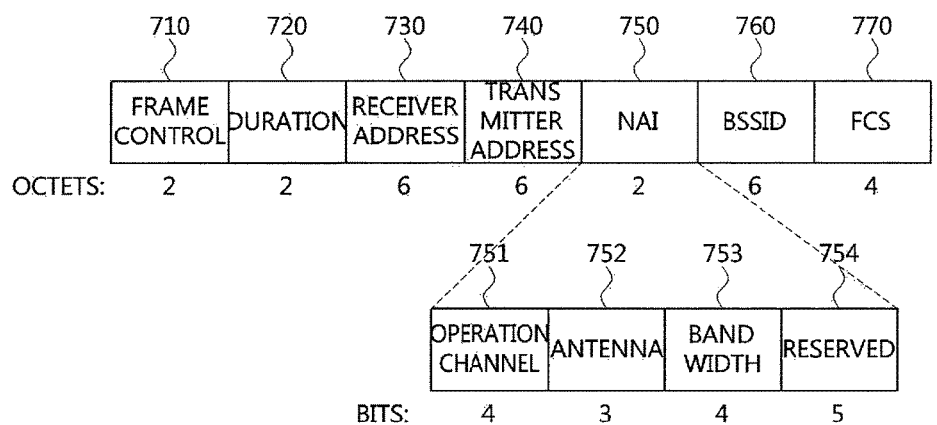
FIG. 7 is a block diagram illustrating a configuration of an NAI frame.

FIG. 7 is a block diagram illustrating a configuration of an NAI frame.

As illustrated in FIG. 7, the NAI frame may include a frame control field 710 having a 2-octet size, a duration field 720 having a 2-octet size, a receiver address (RA) field 730 having a 6-octet size, a transmitter address (TA) field 740 having a 6-octet size, an NAI field 750 having a 2-octet size, a basic service set identifier (BSSID) field 760 having a 6-octet size, and a frame check sequence (FCS) field 770 having a 4-octet size.

The NAI field 750 may include an operation channel field 751 having a 4-bit size, an antenna field 752 having a 3-bit size, a bandwidth field 753 having a 4-bit size, and a reserved field 754 having a 5-bit size. Also, the NAI field 750 may further include identification information of a terminal that is interfered with by a corresponding access point. The operation channel field 751 may represent an operation channel number of the corresponding access point. The antenna field 752 may represent the number of transmission antennas of the corresponding access point and the like. The bandwidth field 753 may represent a bandwidth used by the corresponding access point and the like.

Referring again to FIGS. 5, 6A and 6B, the third access point AP3 may transmit the NAI frame 604 including at least one of identification information of the first terminal STA1 interfered with by the third access point AP3, and identification information, operation channel information, bandwidth information and antenna information of the third access point AP3 to the controller (C). The second access point AP2 may transmit the NAI frame 605 including at least one of identification information of the first terminal STA1 interfered with the second access point AP2, and identification information, operation channel information, bandwidth information and antenna information of the second access point AP2 to the controller (C). The first access point AP1 may transmit the NAT frame 606 including at least one of identification information of the first terminal STA1 connected to the first access point AP1, and identification information, operation channel information, bandwidth information and antenna information of the first access point AP1 to the controller (C).

The controller (C) may identify a terminal interfered with by the second access point AP2 and the third access point AP3 based on information included in the NAI frames 604, 605 and 606 received from the access points AP1, AP2 and AP3. Also, the controller (C) may identify the overlapping band based on information included in the NAI frames 604, 605 and 606 and information (for example, information on a band in which each of the access points AP1, AP2 and AP3 connected to the controller (C) operates) that is stored in its own database in advance, and determine a subcarrier to be transmitted through the overlapping band as a subcarrier to which interference alignment technology may be applied. That is, the controller (C) may determine a subcarrier to be transmitted in an overlapping band between the channel 1 301 and the channel 2 302 and an overlapping band between the channel 1 301 and the channel 3 303 as a subcarrier to which interference alignment technology may be applied.

The controller (C) may transmit an NAI frame 607 including information on a band in which a subcarrier to which interference alignment technology is applied may be transmitted to each of the access points AP1, AP2 and AP3 via wired or wireless communication. Here, the NAI frame 607 may be configured as similar to or the same as the NAI frame illustrated in FIG. 7.

For example, the NAI field of the NAI frame 607 may include only information on the band in which a subcarrier to which interference alignment technology is applied may be transmitted. Also, the NAI frame 607 may further include the NAI field (that is, operation channel information, bandwidth information, antenna information, and the like of the first access point AP1) of the first access point AP1, the NAI field (that is, operation channel information, bandwidth information, antenna information, and the like of the second access point AP2) of the second access point AP2, and the NAI field (that is, operation channel information, bandwidth information, antenna information, and the like of the third access point AP3) of the third access point AP3. In this case, each of the access points AP1, AP2 and AP3 that have received the NAI frame 607 may directly determine the band in which a subcarrier to which interference alignment technology is applied may be transmitted based on information included in the NAI frame 607.

That is, when each of the access points AP1, AP2 and AP3 receives the NAI frame 607, it is possible to recognize the band in which a subcarrier to which interference alignment technology is applied may be transmitted. Also, each of the access points AP1, AP2 and AP3 may recognize that NDP response frames 609, 610 and 611 may be transmitted from the first terminal STA1 in order to estimate channel information after the NAI frame 607.

Among the access points AP1, AP2 and AP3 that have received the NAI frame 607, the first access point AP1 connected to the first terminal STA1 may transmit a null data packet (NDP) request frame 608 to the first terminal STA1 in order to estimate information on a channel used for interference alignment. In this case, when the channel 1 301 is in an idle state during the DIFS, the first access point AP1 may transmit the NDP request frame 608 to the first terminal after a contention window according to random backoff. Hereinafter, a configuration of the NDP request frame 608 will be described.

Figure 8:
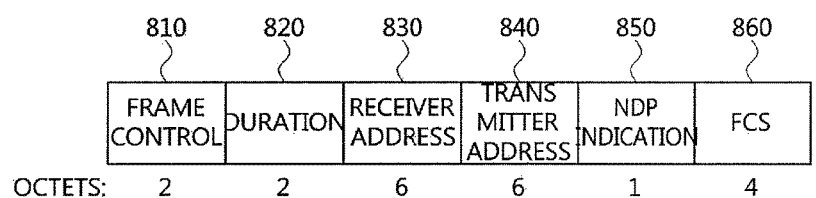
FIG. 8 is a block diagram illustrating a configuration of an NDP request frame.

FIG. 8 is a block diagram illustrating a configuration of an NDP request frame.

As illustrated in FIG. 8, the NDP request frame may include a frame control field 810 having a 2-octet size, a duration field 820 having a 2-octet size, a receiver address field 830 having a 6-octet size, a transmitter address field 840 having a 6-octet size, an NDP indication field 850 having a 1-octet size, and an FSC field 860 having a 4-octet size. Here, the NDP indication field 850 may represent a request for transmission of the NDP response frame.

Referring again to FIGS. 5, 6A and 6B, the first terminal STA1 may receive the NDP request frame 608 from the first access point AP1 (S504). The first terminal STA1 may transmit the NDP response frames 609, 610 and 611 to each of the access points AP1, AP2 and AP3 in response to the NDP request frame 608 such that each of the access points AP1, AP2 and AP3 may estimate channel information (S505). That is, the first terminal STA1 may transmit the NDP response frame 609 to the first access point AP1 after a short inter frame space (SIFS) from a reception end time of the NDP request frame 608.

Then, the first terminal STA1 may transmit the NDP response frame 610 to the second access point AP2 through the channel 2 302. In this case, when the channel 2 302 is in an idle state during the DIFS, the first terminal STA1 may transmit the NDP response frame 610 to the second access point AP2 after a contention window according to a random backoff procedure. Also, the first terminal STA1 may transmit the NDP response frame 611 to the third access point AP3 through the channel 3 303. In this case, when the channel 3 303 is in an idle state during the DIFS, the first terminal STA1 may transmit the NDP response frame 611 to the third access point AP3 after a contention window according to a random backoff procedure. Hereinafter, configurations of the NDP response frames 609, 610 and 611 will be described.

Figure 9:
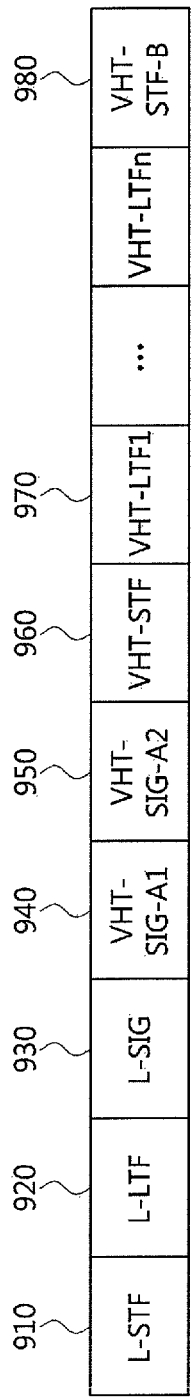
FIG. 9 is a block diagram illustrating a configuration of an NDP response frame.

FIG. 9 is a block diagram illustrating a configuration of an NDP response frame.

As illustrated in FIG. 9, the NDP response frame may include a legacy-short training field (L-STF) 910, a legacy-long training field (L-LTF) 920, a legacy-signal (L-SIG) field 930, a very high throughput (VHT)-SIG-A1 field 940, a VHT-SIG-A2 field 950, a VHT-STF 960, at least one VHT-LTF 970, a VHT-SIG B field 980, and the like. That is, the NDP response frame may be the same as the NDP frame specified in IEEE 802.11.

Referring again to FIGS. 5, 6A and 6B, each of the access points AP1, AP2 and AP3 that have received the NDP response frames 609, 610 and 611 may identify a desired channel and an interference channel according to channel reciprocity. This is called analog local channel information feedback or implicit local channel information feedback.

That is, the first access point AP1 may estimate channel information from the first terminal STA1 to the first access point AP1 based on the NDP response frame 609 and estimate channel information from the first access point AP1 to the first terminal STA1 based on the estimated information. The second access point AP2 may estimate channel information from the first terminal STA1 to the second access point AP2 based on the NDP response frame 610 and estimate channel information from the second access point AP2 to the first terminal STA1 based on the estimated information. The third access point AP3 may estimate channel information from the first terminal STA1 to the third access point AP3 based on the NDP response frame 611 and estimate channel information from the third access point AP3 to the first terminal STA1 based on the estimated information.

Accordingly, each of the access points AP1, AP2 and AP3 may estimate channel information to the first terminal STA1 and obtain a precoder, a decoder and the like for interference alignment based on the estimated channel information. Each first access point AP1 may provide the precoder, the decoder and the like for interference alignment to the first terminal STA1. Then, each of the access points AP1, AP2 and AP3 may pre-code the frame and transmit the pre-coded frames 612, 613 and 614.

Meanwhile, the first terminal STA1 may receive the pre-coded frame 614 from the first access point AP1 and align interference of the pre-coded frame 614 based on information obtained from the first access point AP1 (S506).
Frame Transmission and Reception Method Based on Interference Alignment in a Distributed Topology FIG. 10 is a conceptual diagram illustrating a decentralized topology to which interference alignment technology is applied.

Figure 10:
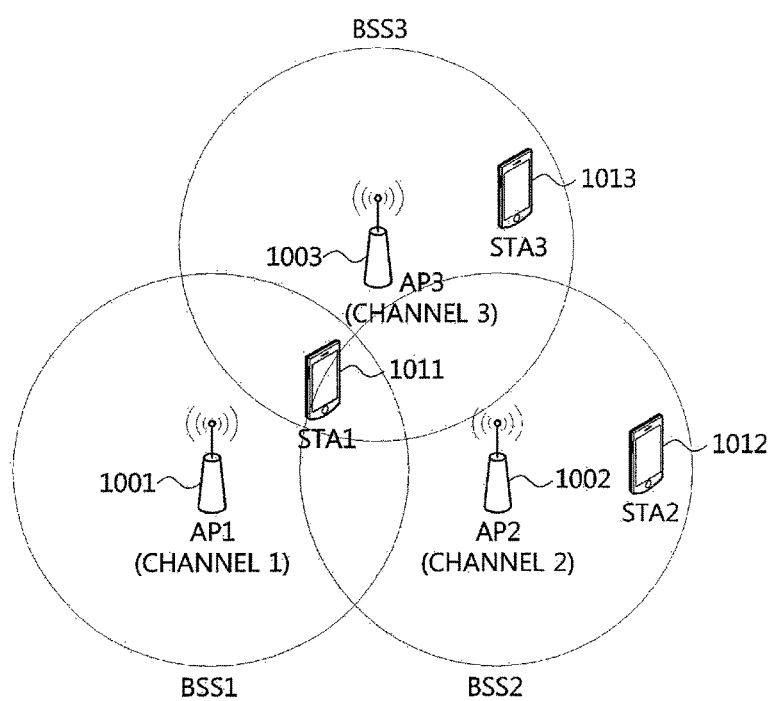
FIG. 10 is a conceptual diagram illustrating a decentralized topology to which interference alignment technology is applied.

As illustrated in FIG. 10, a first access point 1001 may configure BSS1 that is a range covered by its own signal and operate in the channel 1 301, a second access point 1002 may configure BSS2 that is a range covered by its own signal and operate in the channel 2 302, and a third access point 1003 may configure BSS3 that is a range covered by its own signal and operate in the channel 3 303. Here, the BSS1, the BSS2 and the BSS3 may overlap.

A first terminal 1011 may be positioned in an area in which the BSS1, the BSS2 and the BSS3 overlap. When the first terminal 1011 communicates with the first access point 1001 through the channel 1 301, 15 MHz thereof may be interfered with by the second access point 1002 and 10 MHz thereof may be interfered with by the third access point 1003. Meanwhile, since a second terminal 1012 is not positioned in the area in which the BSS1, the BSS2 and the BSS3 overlap, when the second terminal 1012 communicates with the second access point 1002 through the channel 2 302, it may not be interfered with by the other access points 1001 and 1003. Since a third terminal 1013 is not positioned in the area in which the BSS1, the BSS2 and the BSS3 overlap, when the third terminal 1013 communicates with the third access point 1003 through the channel 3 303, it may not be interfered with by the other access points 1001 and 1002.

Meanwhile, the OBSS may occur when access points are provided in an unplanned manner. The station has difficulty in reliably transmitting and receiving a frame in the OBSS. However, when the first terminal 1011 positioned in the overlapping area aligns interference from the other access points 1002 and 1003 in a desired direction, it is possible to minimize interference of a frame received from the first access point 1001. In a decentralized topology in which the access points 1001, 1002 and 1003 are distributed and disposed, each of the stations 1001, 1002, 1003 and 1011 may reliably transmit and receive a frame through a coordination procedure (that is, a sharing procedure of identification information, operation channel information, bandwidth information, antenna information, and the like of a station).

Figure 11:
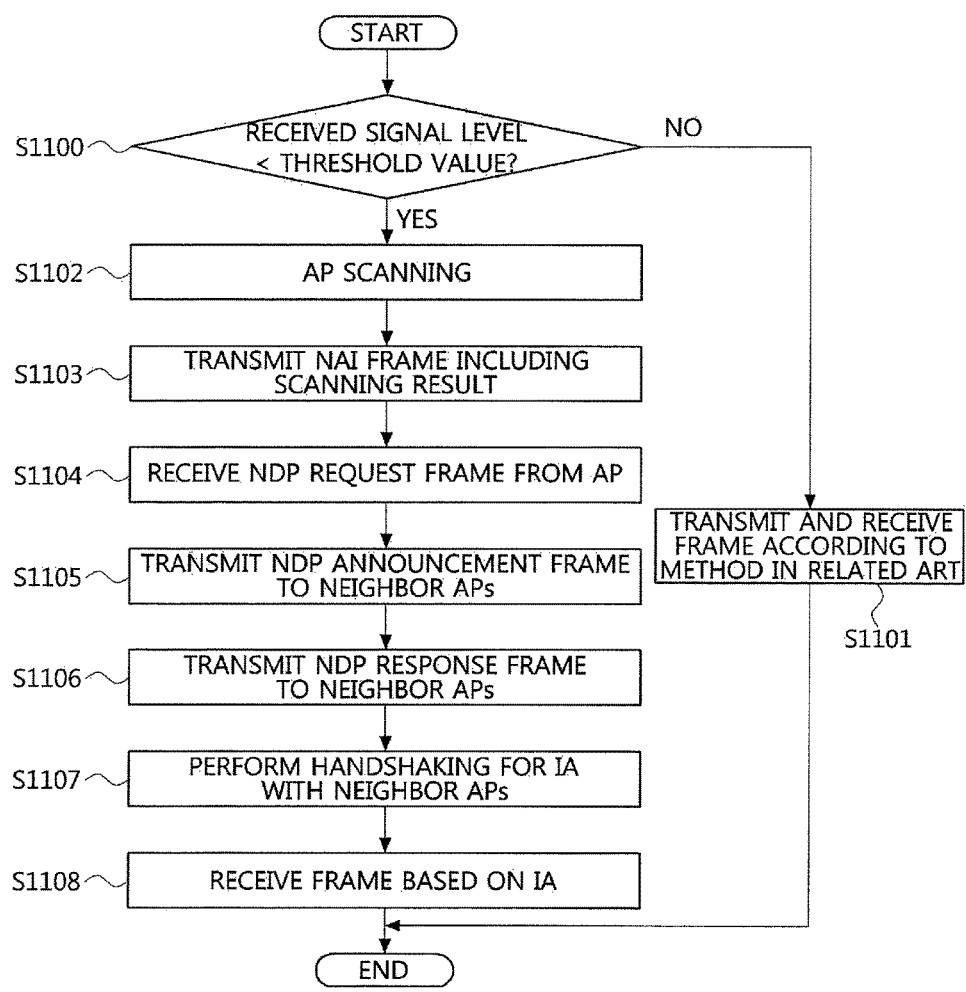
FIG. 11 is a flowchart illustrating a frame transmission and reception method based on interference alignment according to another embodiment of the present invention.
Figure 12A:
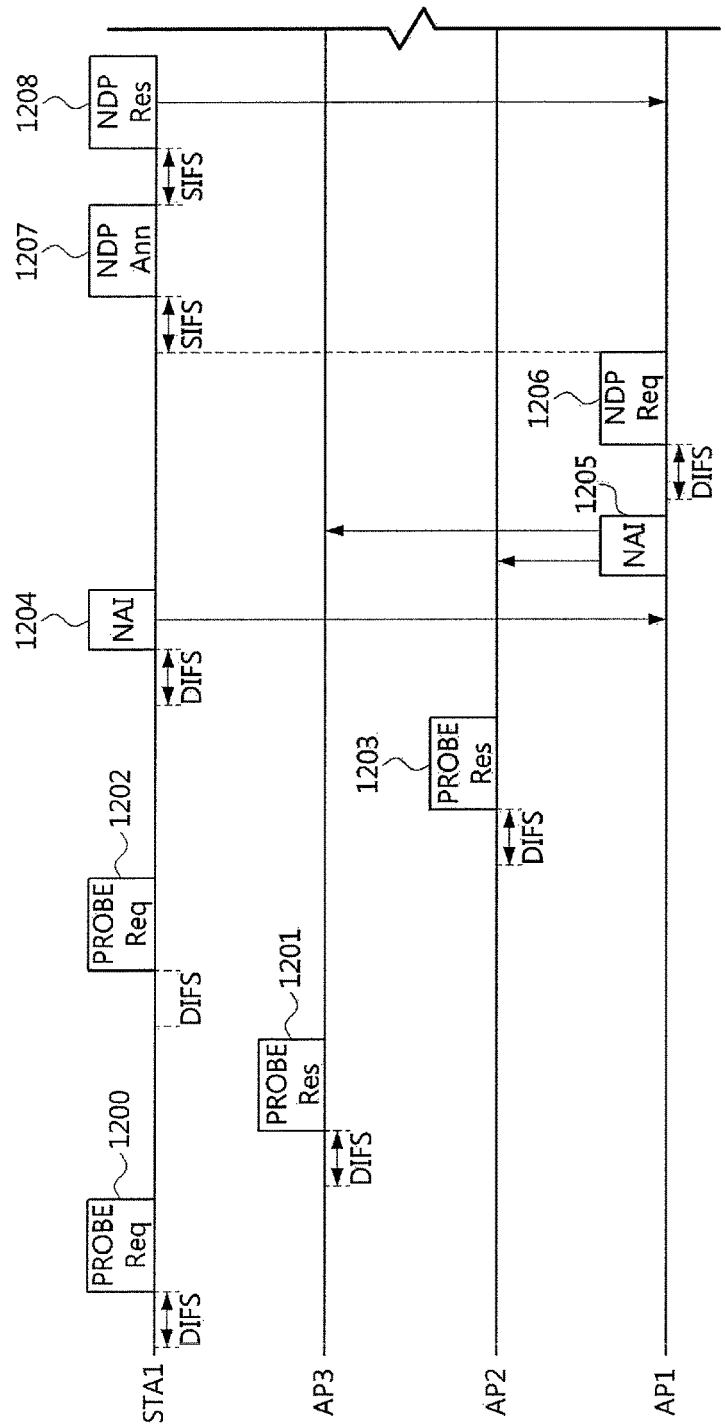
FIGS. 12A and 12B are conceptual diagrams illustrating a frame transmission and reception method based on interference alignment according to another embodiment of the present invention.
Figure 12B:
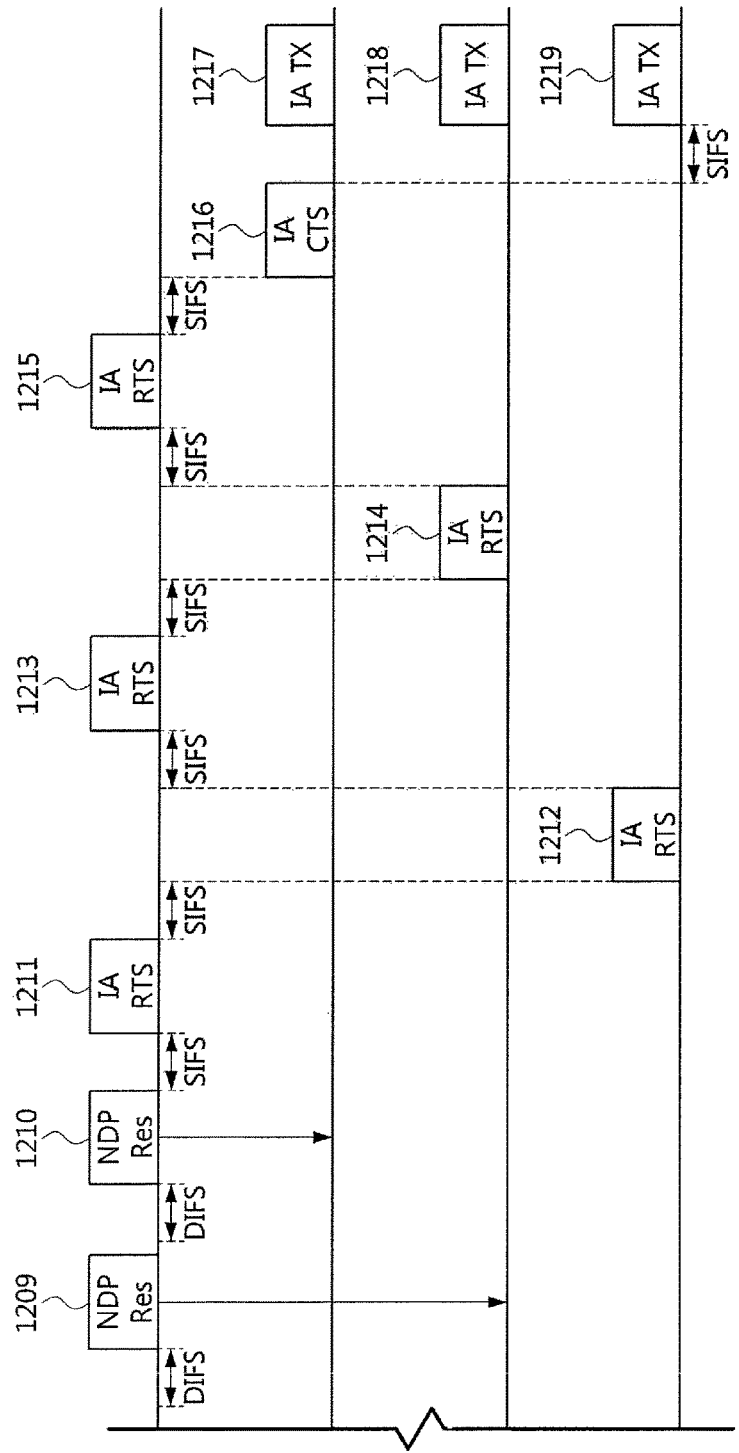

FIG. 11 is a flowchart illustrating a frame transmission and reception method based on interference alignment according to another embodiment of the present invention. FIGS. 12A and 12B are conceptual diagrams illustrating a frame transmission and reception method based on interference alignment according to another embodiment of the present invention.

As illustrated in FIGS. 11, 12A and 12B, the first terminal STA1 may refer to the first terminal 1011 positioned in the area in which the BSS1, the BSS2 and the BSS3 overlap in FIG. 10. The first access point AP1 may refer to the first access point 1001 (that is, an access point operated in the channel 1 301) configuring the BSS1 in FIG. 10. The second access point AP2 may refer to the second access point 1002 (that is, an access point operated in the channel 2 302) configuring the BSS2 in FIG. 10. The third access point AP3 may refer to the third access point 1003 (that is, an access point operated in the channel 3 303) configuring the BSS3 in FIG. 10. Here, the first terminal STA1 may refer to a terminal connected to the first access point AP1. The first terminal STA1, and the access points AP1, AP2 and AP3 may operate in the 2.4 GHz band.

The frame transmission and reception procedure based on interference alignment may be started by the first terminal STA1 positioned in the area in which the BSSs overlap. The first terminal STA1 connected to the first access point AP1 may transmit or receive a frame to or from the first access point AP1 and compare a signal level of any frame received from the first access point AP1 with a preset threshold value (S1100).

That is, the first terminal STA1 may compare a signal level of any frame with a preset threshold value based on Formula 1. When the left-hand side is less than the right-hand side in Formula 1 (that is, when an outage occurs), it may refer to the fact that the minimum data rate required by the first terminal STA1 is not satisfied. That is, it may refer to the fact that transmission between the first terminal STA1 and the first access point AP1 is unreliable. When this situation continues, the first terminal STA1 may not successfully decode the frame received from the first access point AP1 due to interference from the neighbor access points AP2 and AP3. Therefore, when the left-hand side is less than the right-hand side in Formula 1, the first terminal STA1 may start the frame transmission and reception procedure based on interference alignment. On the other hand, when the left-hand side is greater than the right-hand side in Formula 1, the first terminal STA1 may transmit or receive a frame to or from the first access point AP1 according to a method in the related art (S1101).

When the frame transmission and reception procedure based on interference alignment is started, the first terminal STA1 may perform a scanning (for example, active scanning or passive scanning) procedure in order to obtain information on the neighbor access points AP2 and AP3 (S1102). Active scanning in the related art refers to searching all channels (for example, 13 channels in Korea) in the 2.4 GHz band. Here, the first terminal STA1 may scan channels of N−3 to N+3 instead of all channels in order to perform interference alignment in the overlapping band. Here, N may refer to a channel number in which the first terminal STA1 currently operates.

Meanwhile, since orthogonality between channels is maintained in a 5 GHz band, the first terminal STA1 may identify a bandwidth (for example, 20 MHz, 40 MHz, 80 MHz or 160 MHz) used by access points and then determine a channel range to be scanned. That is, when bands used by access points overlap, the first terminal STA1 may move to a channel in which a corresponding access point operates and scan.

Here, since the first terminal STA1 operates in the channel 1 301, it is assumed that scanning on the channel 2 302 and the channel 3 303 is performed. The first terminal STA1 may transmit a probe request frame 1200 through the channel 3 303. In this case, when the channel is in an idle state during the DIFS, the first terminal STA1 may transmit the probe request frame 1200 in a broadcast manner after a contention window according to random backoff.

The probe request frame 1200 may refer to a probe request frame specified in IEEE 802.11 or a short version (for example, a short probe request frame) of the probe request frame. Also, the probe request frame 1200 may refer to a frame specified for the frame transmission and reception procedure based on interference alignment. For example, the probe request frame 1200 may further include at least one of information indicating that the frame transmission and reception procedure based on interference alignment is started, and identification information (for example, an AID, a PAID, and a MAC address), operation channel information (for example, an operation channel number), bandwidth information and antenna information (for example, the number of antennas) of the first terminal STA1.

The third access point AP3 may transmit a probe response frame 1201 that is a response for the probe request frame 1200. In this case, when the channel is in an idle state during the DIFS, the third access point AP3 may transmit the probe response frame 1201 after a contention window according to random backoff. Here, by transmitting the probe response frame 1201, the third access point AP3 may represent participation in the frame transmission and reception procedure based on interference alignment. On the other hand, when the third access point AP3 does not participate in the frame transmission and reception procedure based on interference alignment, a response for the probe request frame 1200 may not be transmitted.

The probe response frame 1201 may refer to a probe response frame specified in IEEE 802.11 or a short version (for example, a short probe response frame) of the probe response frame. Also, the probe response frame 1201 may refer to a frame specified for the frame transmission and reception procedure based on interference alignment. For example, the probe response frame 1201 may further include at least one of information indicating participation in the frame transmission and reception procedure based on interference alignment, and identification information (for example, an SSID and a BSSID), operation channel information, bandwidth information and antenna information of the third access point STA3.

The first terminal STA1 may receive the probe response frame 1201 transmitted from the third access point AP3. The first terminal STA1 may recognize that the third access point AP3 serves as an interference source to the first terminal STA1 based on information included in the probe response frame 1201. Also, the first terminal STA 1 may recognize identification information, operation channel information, bandwidth information, transmitting antenna information, and the like of the third access point AP3.

When all responses for the probe request frame 1200 are received in the channel 3 303 (or when a waiting time set for receiving a response for the probe request frame 1200 is terminated), the first terminal STA1 may move to the channel 2 302 and transmit a probe request frame 1202. In this case, when the channel 2 302 is in an idle state during the DIFS, the first terminal STA1 may transmit the probe request frame 1202 in a broadcast manner after a contention window according to random backoff. The probe request frame 1202 may include the same information as the probe request frame 1200. For example, the probe request frame 1202 may further include at least one of information indicating that the frame transmission and reception procedure based on interference alignment is started, and identification information, operation channel information, bandwidth information and antenna information of the first terminal STA1.

The second access point AP2 operated in the channel 2 302 may receive the probe request frame 1202 transmitted from the first terminal STA1. The second access point AP2 may recognize that the frame transmission and reception procedure based on interference alignment is started by the first terminal STA1 based on information included in the probe request frame 1202 and recognize identification information, operation channel information, bandwidth information, antenna information, and the like of the first terminal STA1.

The second access point AP2 may transmit a probe response frame 1203 that is a response for the probe request frame 1202. In this case, when the channel 2 302 is in an idle state during the DIFS, the second access point AP2 may transmit the probe response frame 1203 after a contention window according to random backoff. Here, by transmitting the probe response frame 1203, the second access point AP2 may represent participation in the frame transmission and reception procedure based on interference alignment. On the other hand, when the second access point AP2 does not participate in the frame transmission and reception procedure based on interference alignment, a response for the probe request frame 1202 may not be transmitted.

The probe response frame 1203 may include the same information as the probe response frame 1201. For example, the probe response frame 1203 may further include at least one of identification information, operation channel information, bandwidth information and antenna information of the second access point STA2.

The first terminal STA1 may receive the probe response frame 1203 transmitted from the second access point AP2. The first terminal STA1 may recognize that the second access point AP2 serves as an interference source to the first terminal STA1 based on information included in the probe response frame 1203. Also, the first terminal STA1 may recognize identification information, operation channel information, bandwidth information, antenna information, and the like of the second access point AP2.

Also, when all responses for the probe request frame 1202 are received in the channel 2 302 (or when a waiting time set for receiving a response for the probe request frame 1202 is terminated), the first terminal STA1 may move to the channel 4 304 and transmit a probe request frame (not illustrated), and receive a probe response frame (not illustrated) that is a response for the probe request frame (not illustrated).

When the scanning procedure is completed, the first terminal STA1 may identify an overlapping band based on the scanning result. That is, the first terminal STA1 may identify that some band between the channel 1 301 in which the first terminal STA1 operates and the channel 2 302 in which the second access point AP2 operates overlaps and identify that some band between the channel 1 301 in which the first terminal STA1 operates and the channel 3 303 in which the third access point AP3 operates overlaps. The first terminal STA1 may recognize that interference alignment technology is applied to a subcarrier to be transmitted through the overlapping band.

Then, the first terminal STA1 may generate an NAI frame 1204 including the scanning result and transmit the generated NAI frame 1204 to the first access point AP1 (S1103). The NAI frame 1204 may be the same as the NAI frame described above with reference to FIG. 7.

That is, the NAI frame 1204 may include a frame control field, a duration field, a receiver address field, a transmitter address field, an NAI field, a BSSID field and an FCS field. The NAI field may include an operation channel field, an antenna field, a bandwidth field and a reserved field. As many NAI fields as the number of neighbor access points may be included in the NAI frame 1204. For example, when there are three neighbor access points, three NAI fields may be included in the NAI frame 1204.

Here, the NAI frame 1204 may further include the NAI field (that is, operation channel information, bandwidth information, antenna information and the like of the second access point AP2) of the second access point AP2, and the NAI field (that is, operation channel information, bandwidth information, antenna information and the like of the third access point AP3) of the third access point AP3.

The first access point AP1 may receive the NAI frame 1204 from the first terminal STA1. The first access point AP1 may identify that the first terminal STA1 is interfered with by the second access point AP2 and the third access point AP3 based on information included in the NAI frame 1204. Also, the first access point AP1 may recognize identification information, operation channel information, bandwidth information, antenna information and the like of the second access point AP2 and the third access point AP3 which interfere with the first terminal STA1.

When reception of the NAI frame 1204 is completed, the first access point AP1 may transmit an NAI frame 1205 to the second access point AP2 and the third access point AP3 via wired or wireless communication. The NAI frame 1205 may include the same information as information included in the NAT frame 1204. Also, the NAI frame 1205 may further include operation channel information, bandwidth information and antenna information and the like of the first access point AP1 in addition to information included in the NAI frame 1204. In addition, the NAI frame 1205 may further include information on an overlapping band in which a subcarrier to which interference alignment technology is applied may be transmitted.

When the NAI frame 1205 is received from the first access point AP1, the second access point AP2 may identify an overlapping band between the second access point AP2 and the first access point AP1 and an overlapping band between the second access point AP2 and the third access point AP3 based on information included in the NAI frame 1205. Also, the third access point AP3 may receive the NAI frame 1205 from the first access point AP1. The third access point AP3 may identify an overlapping band between the third access point AP3 and the first access point AP1 and an overlapping band between the third access point AP3 and the second access point AP2 based on information included in the NAI frame 1205.

Then, the first access point AP1 may transmit an NDP request frame 1206 to the first terminal STA1 in order to estimate information on a channel used for interference alignment. In this case, when the channel is in an idle state during the DIFS in the channel 1 301, the first access point AP1 may transmit the NDP request frame 1206 to the first terminal after a contention window according to random backoff. The NDP request frame 1206 may be the same as the NDP request frame described above with reference to FIG. 8.

The first terminal STA1 may receive the NDP request frame 1206 from the first access point AP1 (S1104). In order to announce transmission of NDP response frames 1208, 1209 and 1210 to each of the access points AP1, AP2 and AP3, the first terminal STA1 may transmit an NDP announcement frame 1207 (S1105). That is, the first terminal STA1 may transmit the NDP announcement frame 1207 to the first access point AP1 after the SIFS from a reception end time of the NDP request frame 1206. In addition, the first terminal STA 1 may move to the channel 2 302 and transmit the NDP announcement frame 1207 to the second access point AP2, or move to the channel 3 303 and transmit the NDP announcement frame 1207 to the third access point AP3. Hereinafter, a structure of the NDP announcement frame 1207 will be described.

Figure 13:
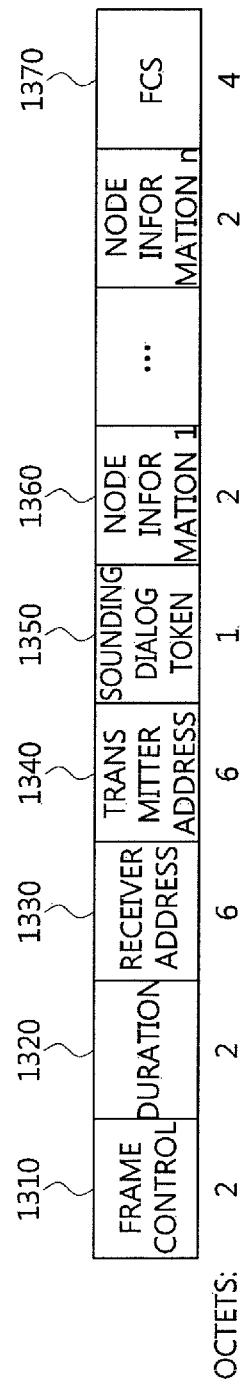
FIG. 13 is a block diagram illustrating a configuration of an NDP announcement frame.

FIG. 13 is a block diagram illustrating a configuration of an NDP announcement frame.

As illustrated in FIG. 13, the NDP announcement frame may include a frame control field 1310 having a 2-octet size, a duration field 1320 having a 2-octet size, a receiver address field 1330 having a 6-octet size, a transmitter address field 1340 having a 6-octet size, a sounding dialog token field 1350 having a 1-octet size, at least one node information field 1360 having a 2-octet size and an FCS field 1370 having a 4-octet size.

The node information field 1360 may include identification information of an access point that will receive the NDP response frame transmitted after a corresponding NDP announcement frame is transmitted. When the NDP response frame is transmitted to each of the plurality of access points after the NDP announcement frame is transmitted, as many node information fields 1360 as the number of plurality of access points may be included in the NDP announcement frame.

When the plurality of node information fields 1360 are included in the NDP announcement frame, a sequence of the plurality of node information fields 1360 positioned in the NDP announcement frame may refer to a sequence in which the NDP response frame is transmitted to each of the plurality of access points. For example, the NDP response frame may be transmitted first to an access point indicated by the first node information field 1360 in the NDP announcement frame, and the NDP response frame may be transmitted second to an access point indicated by the second node information field 1360.

Referring again to FIGS. 11, 12A and 12B, the NDP announcement frame 1207 may include sequentially a node information field 1 indicating the first access point AP1, a node information field 2 indicating the second access point AP2, and a node information field 3 indicating the third access point AP3.

The first access point AP1 that has received the NDP announcement frame 1207 may recognize that the NDP response frame 1208 may be transmitted to the first access point AP1 first among the access points AP1, AP2 and AP3 based on information included in the NDP announcement frame 1207, and set a network allocation vector (NAV) timer based on a duration field included in the NDP announcement frame 1207 in order to receive the NDP response frame 1208.

The second access point AP2 that has received the NDP announcement frame 1207 may recognize that the NDP response frame 1209 may be transmitted second to the second access point AP2 among the access points AP1, AP2 and AP3 based on information included in the NDP announcement frame 1207 and set the NAV timer based on a duration field included in the NDP announcement frame 1207 in order to receive the NDP response frame 1209.

The third access point AP3 that has received the NDP announcement frame 1207 may recognize that the NDP response frame 1210 may be transmitted third to the third access point AP3 among the access points AP1, AP2 and AP3 based on information included in the NDP announcement frame 1207, and set the NAV timer based on a duration field included in the NDP announcement frame 1207 in order to receive the NDP response frame 1210.

Meanwhile, after the NDP announcement frame 1207 is transmitted, the first terminal STA1 may transmit the NDP response frames 1208, 1209 and 1210 to each of the access points AP1, AP2 and AP3 (S1106). That is, the first terminal STA1 may transmit the NDP response frame 1208 to the first access point AP1 through the channel 1 301. After the NDP response frame 1208 is transmitted, the first terminal STA1 may move to the channel 2 302 and transmit the NDP response frame 1209 to the second access point AP2. After the NDP response frame 1209 is transmitted, the first terminal STA1 may move to the channel 3 303 and transmit the NDP response frame 1210 to the third access point AP3. Here, the NDP response frames 1208, 1209 and 1210 may be the same as the NDP response frame described above with reference to FIG. 9.

Each of the access points AP1, AP2 and AP3 that have received the NDP response frames 1208, 1209 and 1210 may identify a desired channel and an interference channel according to channel reciprocity. This is called analog local channel information feedback or implicit local channel information feedback. That is, the first access point AP1 may estimate channel information from the first terminal STA1 to the first access point AP1 based on the NDP response frame 1208 and estimate channel information from the first access point AP1 to the first terminal STA1 based on the estimated information. The second access point AP2 may estimate channel information from the first terminal STA1 to the second access point AP2 based on the NDP response frame 1209 and estimate channel information from the second access point AP2 to the first terminal STA1 based on the estimated information. The third access point AP3 may estimate channel information from the first terminal STA1 to the third access point AP3 based on the NDP response frame 1210 and estimate channel information from the third access point AP3 to the first terminal STA1 based on the estimated information.

Accordingly, each of the access points AP1, AP2 and AP3 may estimate channel information to the first terminal STA1 and obtain a precoder, a decoder and the like for interference alignment based on the estimated channel information. The first access point AP1 may provide the precoder, the decoder and the like for interference alignment to the first terminal STA1.

After the NDP response frames 1208, 1209 and 1210 are transmitted, the first terminal STA1 may notify the access points AP1, AP2 and AP3 of completion of a pre-procedure for frame transmission and reception based on interference alignment (S1107). That is, the first terminal STA1 may transmit an IA request to send (RTS) frame 1211 to the first access point AP1 through the channel 1 301. When the IA RTS frame 1211 is received, the first access point AP1 may recognize that the pre-procedure for frame transmission and reception based on interference alignment is completed, and transmit an IA clear to send (CTS) frame 1212 that is a response for the IA RTS frame 1211 to the first terminal STA1.

Also, the first terminal STA1 may transmit the IA RTS frame 1213 to the second access point AP2 through the channel 2 302. When the IA RTS frame 1213 is received, the second access point AP2 may recognize that the pre-procedure for frame transmission and reception based on interference alignment is completed and transmit an IA CTS frame 1214 that is a response for the IA RTS frame 1213 to the first terminal STA1.

Also, the first terminal STA1 may transmit an IA RTS frame 1215 to the third access point AP3 through the channel 3 303. When the IA RTS frame 1215 is received, the third access point AP3 may recognize that the pre-procedure for frame transmission and reception based on interference alignment is completed and transmit an IA CTS frame 1216 that is a response for the IA RTS frame 1215 to the first terminal STA1.

Hereinafter, configurations of the IA RTS frames 1211, 1213 and 1215 and configurations of the IA CTS frames 1212, 1214 and 1216 will be described.

Figure 14:
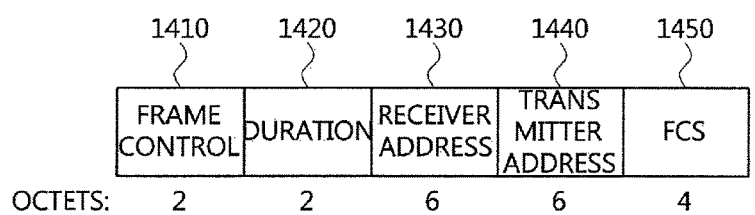
FIG. 14 is a block diagram illustrating a configuration of an IA RTS frame.

FIG. 14 is a block diagram illustrating a configuration of an IA RTS frame.

As illustrated in FIG. 14, the IA RTS frame may include a frame control field 1410 having a 2-octet size, a duration field 1420 having a 2-octet size, a receiver address field 1430 having a 6-octet size, a transmitter address field 1440 having a 6-octet size, and an FCS field 1450 having a 4-octet size.

Figure 15:
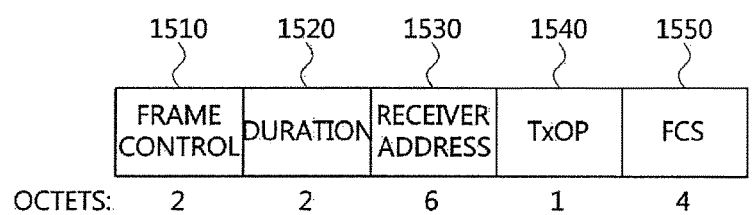
FIG. 15 is a block diagram illustrating a configuration of an IA CTS frame.

FIG. 15 is a block diagram illustrating a configuration of an IA CTS frame.

As illustrated in FIG. 15, the IA CTS frame may include a frame control field 1510 having a 2-octet size, a duration field 1520 having a 2-octet size, a receiver address field 1530 having a 6-octet size, a transmit opportunity (TxOP) field 1540 having a 1-octet size and an FCS field 1550 having a 4-octet size. Here, the TxOP field 1540 may indicate TxOP for an access point that has transmitted the corresponding IA CTS frame.

Referring again to FIGS. 11, 12A and 12B, each of the access points AP1, AP2 and AP3 may pre-code the frame and transmit pre-coded frames 1217, 1218 and 1219. Meanwhile, the first terminal STA1 may receive the pre-coded frame 1219 from the first access point AP1 and align interference of the pre-coded frame 1219 based on information obtained from the first access point AP1 (S1108).

Figure 16:
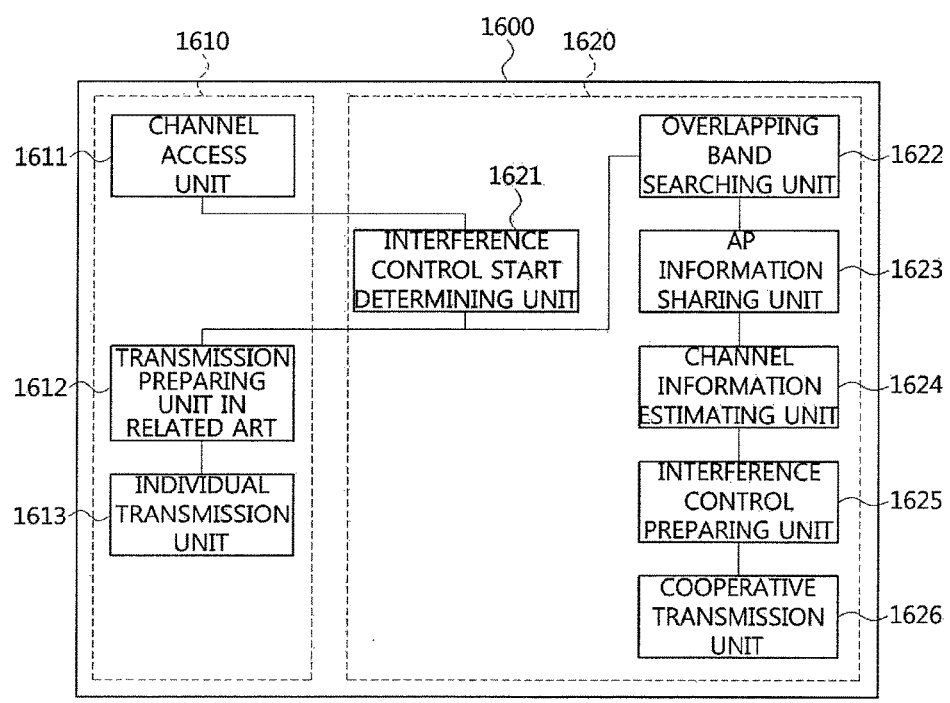
FIG. 16 is a block diagram illustrating another embodiment of a station for performing methods according to the present invention.

FIG. 16 is a block diagram illustrating another embodiment of a station for performing methods according to the present invention.

As illustrated in FIG. 16, a station 1600 may include a frame transmission and reception unit 1610 in the related art configured to transmit and receive a frame according to the IEEE 802.11 standards in the related art, and an interference alignment-based frame transmission and reception unit 1620 configured to transmit and receive a frame based on interference alignment technology. The frame transmission and reception unit 1610 in the related art may include a channel access unit 1611, a transmission preparing unit 1612 in the related art and an individual transmission unit 1613. The interference alignment-based frame transmission and reception unit 1620 may include an interference control start determining unit 1621, an overlapping band searching unit 1622, an AP information sharing unit 1623, a channel information estimating unit 1624, an interference control preparing unit 1625 and a cooperative transmission unit 1626.

The channel access unit 1611 may perform a function of accessing a channel. That is, the channel access unit 1611 may be involved in a scanning procedure (for example, active scanning or passive scanning), a certification procedure (for example, transmission of a certification request frame and reception of a certification response frame), and a connection procedure (for example, transmission of a connection request frame and reception of a connection response frame).

After accessing the channel, the interference control start determining unit 1621 may perform a function of determining whether the frame transmission and reception procedure based on interference alignment is started based on a signal level of the received frame. That is, the interference control start determining unit 1621 may perform operation S500 described above with reference to FIG. 5 and operation S1100 described with reference to FIG. 11. When the signal level of the received frame is greater than a preset threshold value, the frame transmission and reception procedure based on interference alignment may not be started. In this case, the transmission preparing unit 1612 in the related art and the individual transmission unit 1613 may transmit and receive a frame according to the IEEE 802.11 standards in the related art.

On the other hand, when the signal level of the received frame is less than the preset threshold value, the frame transmission and reception procedure based on interference alignment may be started. In this case, the frame transmission and reception procedure based on interference alignment may be performed by the overlapping band searching unit 1622, the AP information sharing unit 1623, the channel information estimating unit 1624, the interference control preparing unit 1625 and the cooperative transmission unit 1626.

The overlapping band searching unit 1622 may perform a function of searching for an overlapping band between access points. That is, the overlapping band searching unit 1622 may perform operation S502 and operation S503 described above with reference to FIG. 5, and perform operation S1102 described above with reference to FIG. 11. The AP information sharing unit 1623 may perform a function of sharing information on the neighbor access point found through the scanning procedure. That is, the AP information sharing unit 1623 may be involved in the procedure of transmitting and receiving the NAI frames 604, 605, 606 and 607 described above with reference to FIGS. 6A and 6B and the procedure of transmitting and receiving the NAI frames 1204 and 1205 described above with reference to FIGS. 12A and 12B.

The channel information estimating unit 1624 may perform a function of estimating a channel between a terminal and an access point. That is, the channel information estimating unit 1624 may be involved in the procedure of transmitting and receiving the NDP request frame 608 and the procedure of transmitting and receiving the NDP response frames 609, 610 and 611 described above with reference to FIGS. 6A and 6B. Also, the channel information estimating unit 1624 may be involved in the procedure of transmitting and receiving the NDP request frame 1206, the procedure of transmitting and receiving the NDP announcement frame 1207, and the procedure of transmitting and receiving the NDP response frames 1208, 1209 and 1210 described above with reference to FIGS. 12A and 12B.

The interference control preparing unit 1625 may perform a function of indicating that the pre-procedure for the frame transmission and reception procedure based on interference alignment is completed. That is, the interference control preparing unit 1625 may perform the procedure of transmitting and receiving the IA RTS frames 1211, 1213 and 1215 and the procedure of transmitting and receiving the IA CTS frames 1212, 1214 and 1216 described above with reference to FIGS. 12A and 12B.

The cooperative transmission unit 1626 may perform a function of transmitting and receiving a frame to which interference alignment technology is applied. That is, the cooperative transmission unit 1626 may be involved in the procedure of transmitting and receiving the pre-coded frames 612, 613 and 614 described above with reference to FIGS. 6A and 6B and the procedure of transmitting and receiving the pre-coded frames 1217, 1218 and 1219 described above with reference to FIGS. 12A and 12B.

According to the present invention, it is possible to address an interference problem between neighbor access points through interference alignment. When information necessary for interference alignment between access points is shared in the centralized topology (or in the decentralized topology), interference alignment may be applied to the overlapping band. Also, interference alignment may be applied to only the subcarrier transmitted through the overlapping band. Accordingly, it is possible to improve reliability and frequency efficiency of the wireless local area network system.

According to the present invention, it is possible to control interference in an overlapping band between neighbor access points in a wireless local area network.

Embodiments of the present invention may be implemented in the form of program instructions that can be performed through various computer units and recorded in computer readable media. The computer readable media may include a program instruction, a data file, a data structure, or combinations thereof. The program instruction recorded in the computer readable media may be specially designed and prepared for the embodiments of the invention or may be an available well-known instruction for those skilled in the field of computer software.

The computer readable media may refer to a hardware device that is specially made to store and perform the program instruction such as a ROM, a RAM, or a flash memory. The hardware device may be configured as at least one software module in order to perform operations of embodiments of the present invention and vice versa. The program instruction may refer to a machine code generated by a compiler and a high-level language code that can be executed in a computer based on an interpreter or the like.

While the present invention has been described with reference to exemplary embodiments, it will be understood by those skilled in the art that various changes and modifications may be made without departing from the spirit and scope of the present invention as defined by the appended claims.

What is claimed is:

1. A method of receiving a frame that is performed in a terminal, the method comprising:
receiving a first frame from a first access point associated with the terminal;
comparing a signal level of the first frame with a preset data rate;
performing a pre-procedure for interference alignment when the signal level of the first frame is less than the preset data rate;
receiving a second frame from the first access point; and
aligning interference of the second frame based on information obtained through the pre-procedure,
wherein the performing of the pre-procedure includes:
transmitting, to at least one neighbor access point operated in a channel overlapping an operation channel of the first access point, a probe request frame includes an indicator indicating that a frame transmission and reception procedure based on interference alignment is initiated;
receiving, from the at least one neighbor access point, a probe response frame including the information in response to the probe request frame; and
performing a procedure for estimating a channel between the first access point and the at least one neighbor access point,
wherein the information includes an operation channel number, bandwidth information, and a number of antennas which are supported by the at least one neighbor access point.

2. The method of claim 1, wherein the probe response frame is received from the at least one neighbor access point operated within a preset channel range based on an operation channel of the first access point.

3. The method of claim 1, wherein the performing of the procedure for estimating a channel includes:
receiving a null data packet (NDP) request frame from the first access point; and
transmitting an NDP response frame that is a response for the NDP request frame to each of the first access point and the at least one neighbor access point.

4. A method of receiving a frame that is performed in a terminal, the method comprising:
receiving a first frame from a first access point associated with the terminal;
comparing a signal level of the first frame with a preset data rate;
performing a pre-procedure for interference alignment when the signal level of the first frame is less than the preset data rate;
receiving a second frame from the first access point; and
aligning interference of the second frame based on information obtained through the pre-procedure,
wherein the performing of the pre-procedure for interference alignment includes:
transmitting, to at least one neighbor access point operated in channel overlapping an operation channel of the first point, a probe request frame includes an indicator indicating that a frame transmission and reception procedure based on interference alignment is initiated;
receiving, from the at least one neighbor access point, a probe response frame including the information in response to the probe request frame;
transmitting the information on at least one neighbor access point to the first access point;
performing a procedure for estimating a channel between the first access point and the at least one neighbor access point; and
announcing completion of the pre-procedure for interference alignment,
wherein the information includes an operation channel number, bandwidth information, and a number of antennas which are supported by the at least one neighbor access point.

5. The method of claim 4, wherein the performing of the procedure for estimating a channel includes:
receiving an NDP request frame from the first access point;
transmitting an NDP announcement frame for announcing transmission of an NDP response frame to each of the first access point and the at least one neighbor access point; and
transmitting the NDP response frame to the first access point and the at least one neighbor access point.

6. The method of claim 5, wherein the NDP announcement frame includes identification information of each of the first access point and the at least one neighbor access point.

7. The method of claim 4, wherein the announcing of completion of the pre-procedure for interference alignment includes:
transmitting an interference alignment (IA) request to send (RTS) frame indicating completion of the pre-procedure for interference alignment to each of the first access point and the at least one neighbor access point; and
receiving an IA clear to send (CTS) frame that is a response for the IA RTS frame from each of the first access point and the at least one neighbor access point.

8. A terminal, comprising:
a processor; and
a memory in which at least one program command executed through the processor is stored, wherein the at least one program command causes the terminal to execute:
receiving a first frame from a first access point associated with the terminal;
comparing a signal level of the first frame with a preset minimum data rate;
performing a pre-procedure for interference alignment when the signal level of the first frame is less than the preset minimum data rate;
receiving a second frame from the first access point; and
aligning interference of the second frame based on information obtained through the pre-procedure,
wherein the performing of the pre-procedure for interference alignment includes:
transmitting, to at least one neighbor access point operated in a channel overlapping an operation channel of the first access point, a probe request frame includes an indicator indicating that a frame transmission and reception procedure based on interference alignment is initiated;
receiving, from the at least one neighbor access point, a probe response frame including the information in response to the probe request frame; and performing a procedure for estimating a channel between the first access point and the at least one neighbor access point, wherein the information includes an operation channel number, bandwidth information, and a number of antennas which are supported by the at least one neighbor access point.

9. The terminal of claim 8, wherein the performing of the procedure for estimating a channel includes:

receiving a null data packet (NDP) request frame from the first access point; and transmitting an NDP response frame that is a response for the NDP request frame to each of the first access point and the at least one neighbor access point.

10. A terminal, comprising:

a processor; and a memory in which at least one program command executed through the processor is stored, wherein the at least one program command causes the terminal to execute:

receiving a first frame from a first access point associated with the terminal;

comparing a signal level of the first frame with a preset minimum data rate;

performing a pre-procedure for interference alignment when the signal level of the first frame is less than the preset minimum data rate;

receiving a second frame from the first access point; and aligning interference of the second frame based on information obtained through the pre-procedure, wherein the performing of the pre-procedure for interference alignment includes:

transmitting, to at least one neighbor access point operated in a channel overlapping an operation channel of the first access point, a probe request frame includes an indicator indicating that a frame transmission and reception procedure based on interference alignment is initiated;

receiving, from the at least one neighbor access point, a probe response frame including the information in response to the probe request frame; and transmitting the information on at least one neighbor access point to the first access point;

performing a procedure for estimating a channel between the first access point and the at least one neighbor access point; and announcing completion of the pre-procedure for interference alignment, wherein the information includes an operation channel number, bandwidth information, and a number of antennas which are supported by the at least one neighbor access point.

11. The terminal of claim 10, wherein the announcing of completion of the pre-procedure for interference alignment includes:

transmitting an interference alignment (IA) request to send (RTS) frame indicating completion of the pre-procedure for interference alignment to each of the first access point and the at least one neighbor access point; and receiving an IA clear to send (CTS) frame that is a response for the IA RTS frame from each of the first access point and the at least one neighbor access point.

* * * * *